United States Patent
Hyakudai et al.

(10) Patent No.: US 8,350,969 B2
(45) Date of Patent: *Jan. 8, 2013

(54) ELECTRONIC APPARATUS, ELECTRONIC-APPARATUS ADJUSTMENT METHOD AND INTEGRATED CIRCUIT

(75) Inventors: Toshihisa Hyakudai, Chiba (JP); Mitsuru Ikeda, Saitama (JP); Norihiro Murayama, Chiba (JP); Kazuya Nakamura, Tokyo (JP); Masatomo Miyashita, Kanagawa (JP); Kohei Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 861 days.

This patent is subject to a terminal disclaimer.

(21) Appl. No.: 12/399,522

(22) Filed: Mar. 6, 2009

(65) Prior Publication Data
US 2009/0251617 A1 Oct. 8, 2009

(30) Foreign Application Priority Data
Apr. 3, 2008 (JP) .................. 2008-097574

(51) Int. Cl.
H04N 7/01 (2006.01)
(52) U.S. Cl. ..................... 348/725
(58) Field of Classification Search .......... 348/725, 348/731, 732, 552, 726; 455/179.1, 188.1, 455/189.1; 375/316, 347, 350
See application file for complete search history.

(56) References Cited

U.S. PATENT DOCUMENTS

| | | | | |
|---|---|---|---|---|
| 5,603,001 A * | 2/1997 | Sukegawa et al. | ........... | 711/103 |
| 5,737,035 A * | 4/1998 | Rotzoll | ........... | 348/725 |
| 6,681,395 B1 * | 1/2004 | Nishi | ........... | 725/45 |
| 7,308,550 B2 * | 12/2007 | Cornett | ........... | 711/170 |
| 7,330,502 B2 * | 2/2008 | Hotta | ........... | 375/221 |
| 7,333,574 B2 * | 2/2008 | Ashida | ........... | 375/345 |
| 7,373,124 B2 * | 5/2008 | Okanobu | ........... | 455/226.1 |
| 7,453,527 B2 * | 11/2008 | Birleson et al. | ........... | 348/731 |
| 7,460,546 B2 * | 12/2008 | Anderson, IV | ........... | 370/401 |
| 7,831,223 B2 * | 11/2010 | Kawashima | ........... | 455/115.2 |
| 7,996,003 B2 * | 8/2011 | Maeda et al. | ........... | 455/423 |
| 2003/0026355 A1 * | 2/2003 | Thiele | ........... | 375/316 |
| 2004/0039927 A1 * | 2/2004 | Hazama et al. | ........... | 713/189 |
| 2006/0010230 A1 * | 1/2006 | Karklins et al. | ........... | 709/223 |
| 2006/0192859 A1 * | 8/2006 | Sasaki | ........... | 348/222.1 |
| 2007/0094507 A1 * | 4/2007 | Rush | ........... | 713/176 |
| 2009/0244397 A1 * | 10/2009 | Aoki et al. | ........... | 348/725 |
| 2009/0244400 A1 * | 10/2009 | Yoshida et al. | ........... | 348/731 |
| 2010/0026906 A1 * | 2/2010 | Okanobu | ........... | 348/731 |

FOREIGN PATENT DOCUMENTS
JP 11-168399 6/1999

* cited by examiner

*Primary Examiner* — Paulos Natnael
(74) *Attorney, Agent, or Firm* — K&L Gates LLP

(57) ABSTRACT

An electronic apparatus is provided and includes a first IC having an internal configuration section, a nonvolatile memory, and an interface section. The electronic apparatus also includes a second IC having a signal processing section, and a correction-data supplying section.

9 Claims, 17 Drawing Sheets

FIG. 3
TYPICAL DATA IN THE NONVOLATILE MEMORY

| | | | | |
|---|---|---|---|---|
| ADJUSTED DATA FOR THE IC ITSELF | TRACKING-FILTER ADJUSTED DATA | UHF | | |
| | | VHF-H | | |
| | | VHF-L | | |
| | IQ-AMPLITUDE ADJUSTED DATA | | | ... |
| | IQ-PHASE ADJUSTED DATA | | | ... |
| | VCO-CURRENT ADJUSTED DATA | | | ... |
| | IF-BPF CUTOFF-FREQUENCY ADJUSTED DATA | BW=6MHz | | |
| | | BW=7MHz | | |
| | | BW=8MHz | | |
| | TUNING-FREQUENCY SETTING ADJUSTED DATA | | | ... |
| | LEVEL CORRECTION AMPLIFIER ADJUSTED DATA | | | ... |
| | REGULATOR-VOLTAGE SETTING ADJUSTED DATA | | | |
| | ⋮ | | | |
| ADJUSTED DATA FOR CIRCUITS OTHER THAN THE IC ITSELF | VIDEO OUTPUTTING AMPLIFIER GAIN ADJUSTED DATA | | | |
| | ⋮ | | | |

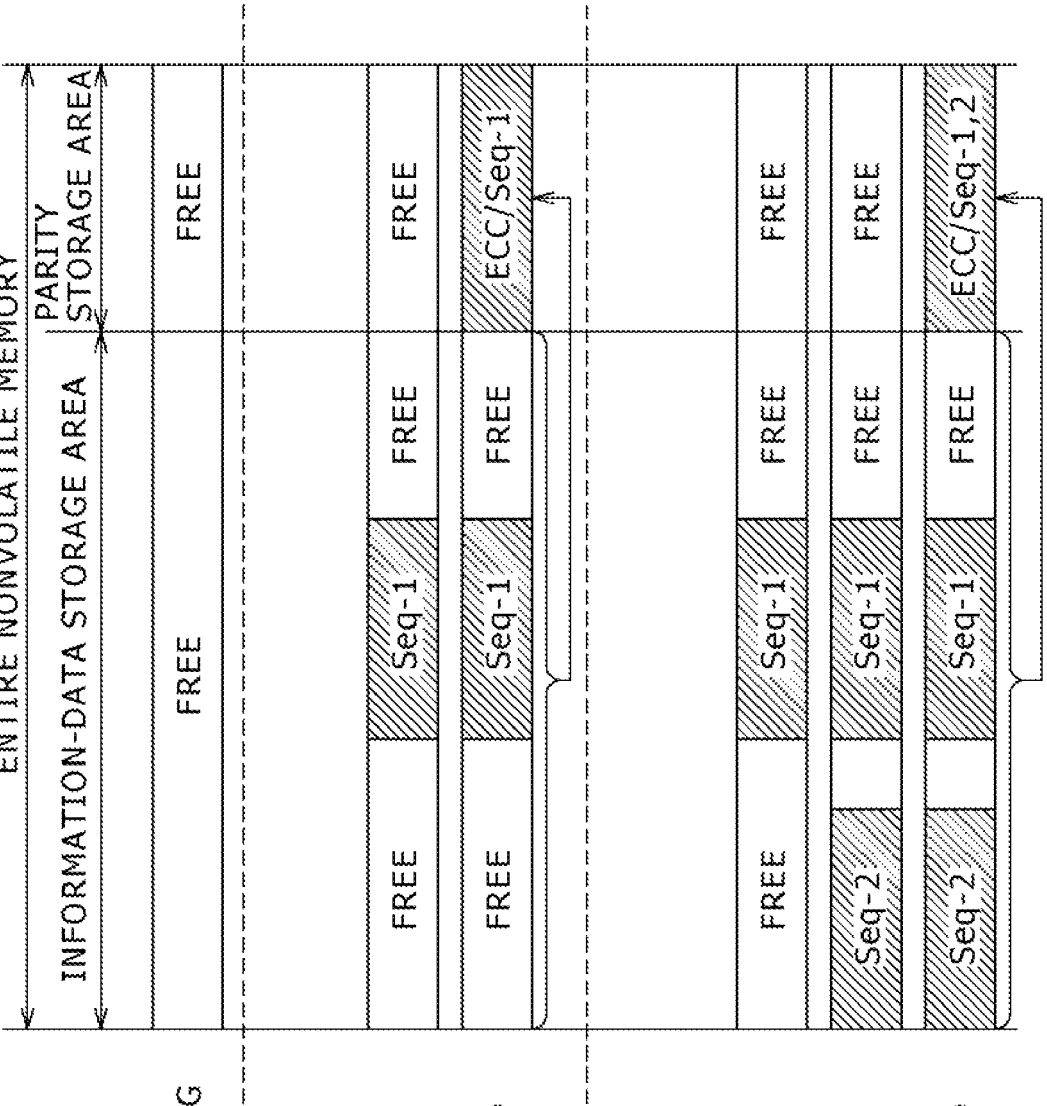

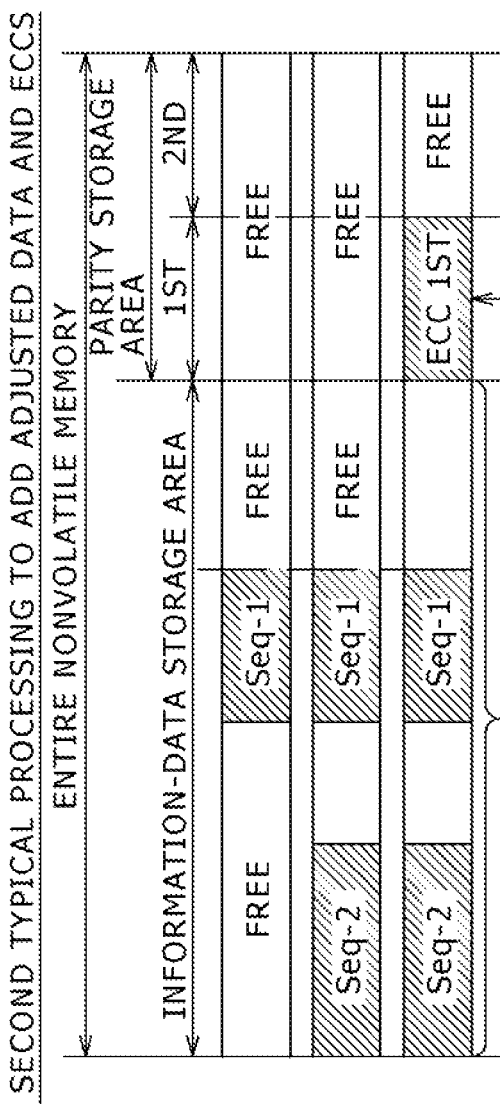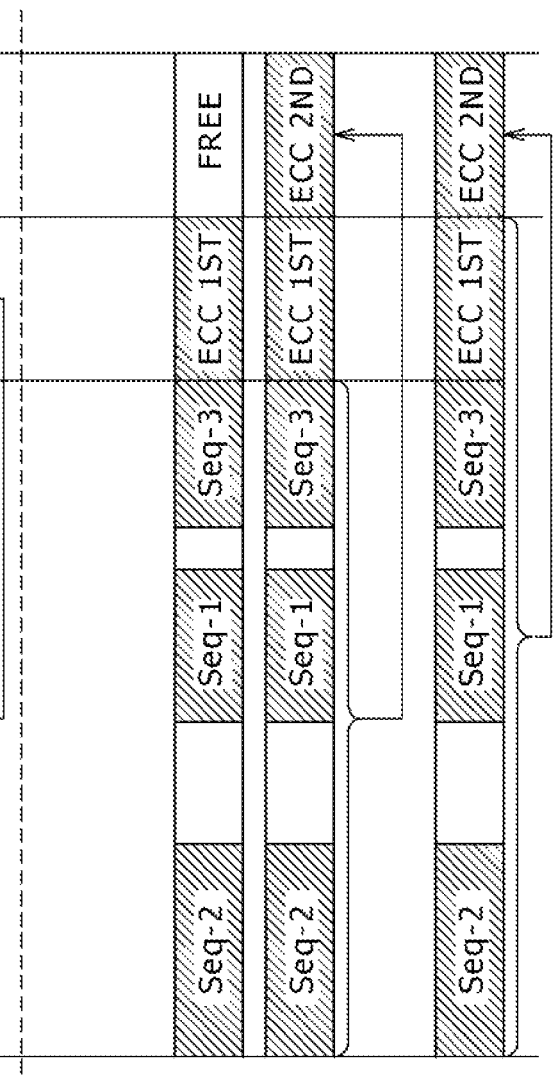

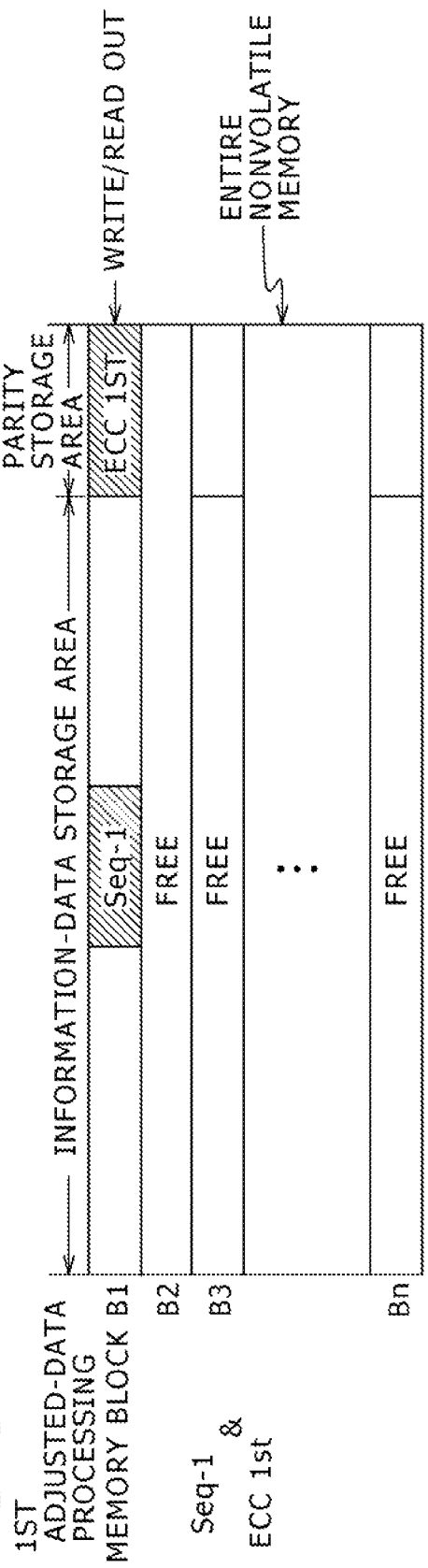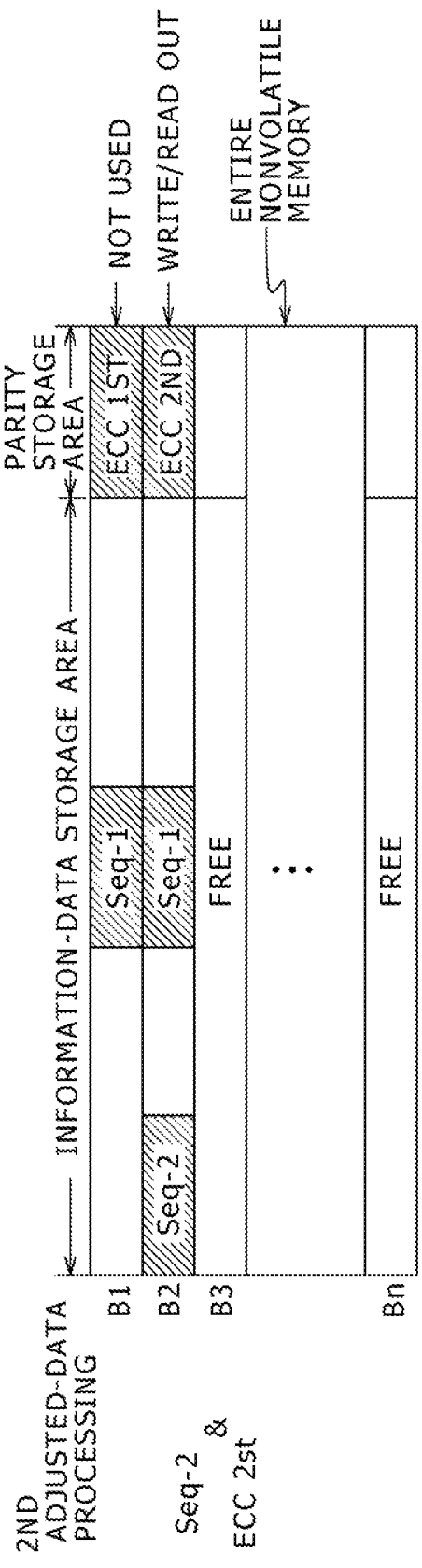

$$\text{IF\_BPF\_COFF} = \frac{\text{IF\_BPF\_COFF2} - \text{IF\_BPF\_COFF1}}{\text{IFBW2} - \text{IFBW1}} \times \text{IFBW}$$

$$+ \frac{\text{IFBW2} \times \text{IF\_BPF\_COFF1} - \text{IFBW1} \times \text{IF\_BPF\_COFF2}}{\text{IFBW2} - \text{IFBW1}}$$

$$\cdots \cdots \text{(Eq.A)}$$

ELECTRONIC APPARATUS, ELECTRONIC-APPARATUS ADJUSTMENT METHOD AND INTEGRATED CIRCUIT

CROSS REFERENCES TO RELATED APPLICATIONS

The present application claims priority to Japanese Patent Application JP 2008-097574 filed in the Japan Patent Office on Apr. 3, 2008, the entire contents of which is being incorporated herein by reference.

BACKGROUND

The present disclosure relates to an electronic apparatus such as a television (TV)-broadcast receiver, a method for adjusting configuration sections employed in the electronic apparatus and ICs (Integrated Circuits) implementing the electronic apparatus.

A variety of adjustments are typically required in a front-end section of a tuner employed in a TV-broadcast receiver. The adjustments include the adjustment of the tuning frequency and gain of a tracking filter employed in a tuning circuit of the front-end section and the adjustment of an image-interference removal characteristic of a band-pass filter provided in the front-end section for a video intermediate frequency.

For example, a variable-capacitance diode can be generally implemented in an IC so that a uniform characteristic can be obtained for all variable-capacitance diodes. However, a coil cannot be implemented in an IC. Thus, the inductance undesirably varies from coil to coil. As a result, since the inductance of the coil employed in a tuning circuit to serve as a coil for tuning varies from circuit to circuit, the tuning frequency of the tuning circuit may inevitably contain a tracking error.

In the past, in order to get rid of a tracking error, an air-core coil was adjusted manually. However, since the air-core coil has a large size, the tuning circuit employing the air-core coil cannot be made compact. In addition, the need to manually adjust the air-core coil raises a problem by itself.

For example, as a typical solution to this problem, Japanese Patent Laid-open No. Hei 11-168399 proposes a receiver capable of automatically getting rid of tracking errors by making use of tracking-error elimination data stored in advance in a nonvolatile memory to serve as data to be used for getting rid of a tracking error contained in the tuning frequency for every reception frequency. To put it concretely, the tracking-error elimination data is supplied to a variable-capacitance diode to serve as data to be used for getting rid of a tracking error contained in the tuning frequency for every reception frequency.

That is to say, in an actual receiver, the tuning data to be supplied to the variable-capacitance diode for every reception frequency is adjusted in order to find an optimum value which maximizes the reception sensitivity. The optimum value is then stored in the nonvolatile memory in advance as pre-found adjusted data for getting rid of a tracking error. Then, the pre-found adjusted data provided for a reception frequency selected by the user is read out from the non-volatile memory to be used as data for getting rid of the tracking error in an automatic tracking-error adjustment process.

Meanwhile, tracking errors of the front-end circuit employed in a receiver are different from tracking errors of the front-end circuit employed in another receiver. Thus, pre-found adjusted data to be stored in a nonvolatile memory associated with the front-end circuit employed in a receiver is also different from pre-found adjusted data to be stored in a nonvolatile memory associated with the front-end circuit employed in another receiver. Accordingly, if a front-end circuit is implemented as an IC, it is possible to conceive a configuration in which a nonvolatile memory associated with the front-end circuit is embedded in the same IC as the front-end circuit and, then, the pre-found adjusted data provided for a reception frequency selected by the user is read out from the non-volatile memory to be used as data for getting rid of the tracking error in an automatic tracking-error adjustment process.

It is necessary to adjust not only the front-end circuit, but also other configuration circuits employed in a TV-broadcast receiver in some cases due to the fact that each of the other configuration circuits includes a resistor with a resistance varying from circuit to circuit as well as a capacitor with a capacitance also varying from circuit to circuit. In such a case, if another configuration circuit is implemented as an IC, it is possible to conceive a configuration in which a nonvolatile memory associated with the other configuration circuit is embedded in the same IC as the other configuration circuit.

However, for a TV-broadcast receiver, it is not economical to provide the configuration in which a nonvolatile memory associated with any of configuration circuits including the front-end circuit is embedded in the same IC as the configuration circuit. Such a configuration raises a problem of a high cost of manufacturing the TV-broadcast receiver.

SUMMARY

Addressing the problem described above, an electronic apparatus capable of effectively adjusting a plurality of circuits by making use of one nonvolatile memory.

In order to solve the problem described above, in accordance with an embodiment, there is provided an electronic apparatus including a first IC (Integrated Circuit) and a second IC. The first IC includes an internal configuration section adjustable by making use of pre-found adjusted data, a nonvolatile memory used for storing a result of a pre-adjustment process carried out on the internal configuration section to serve as the pre-found adjusted data and for storing correction data for another circuit, and an interface section having a data transfer function for transferring data read out from the nonvolatile memory as the pre-found adjusted data and the correction data to an external data recipient and having a data holding function for supplying to-be-actually-used adjusted data received from an external source to the internal configuration section. The second IC includes a signal processing section serving as an internal configuration section connected to the interface section included in the first IC, and a correction-data supplying section configured to supply the correction data to the other circuit. The signal processing section receives the pre-found adjusted data read out from the nonvolatile memory by way of the interface section, generates the to-be-actually-used adjusted data on the basis of the pre-found adjusted data and supplies the to-be-actually-used adjusted data to the interface section, and receives the correction data read out from the nonvolatile memory and supplies the received correction data on the basis of the correction data to the other circuit by way of the correction-data supplying section.

In accordance with another embodiment, there is provided a method for adjusting an electronic apparatus including a first IC and second IC. The first IC has an internal configuration section adjustable by making use of pre-found adjusted data, a nonvolatile memory used for storing a result of a pre-adjustment process carried out on the internal configuration section to serve as the pre-found adjusted data and for storing correction data for another circuit, and an interface section having a data transfer function for transferring data read out from the nonvolatile memory as the pre-found adjusted data and the correction data to an external data recipient and having a data holding function for supplying to-be-actually-used adjusted data received from an external source to the internal configuration section. The second IC has a signal processing section serving as an internal configuration section connected to the interface section included in the first IC, and a correction-data supplying section configured to supply the correction data to the other circuit. The method including the steps of: storing the pre-found adjusted data and the correction data in the nonvolatile memory; receiving the pre-found adjusted data read out from the nonvolatile memory by way of the interface section, generating the to-be-actually-used adjusted data on the basis of the pre-found adjusted data; and supplying the to-be-actually-used adjusted data to the interface section, by the signal processing section, and receiving the correction data read out from the nonvolatile memory by way of the interface section, and supplying the correction data on the basis of the received correction data to the other circuit by way of the correction-data supplying section.

In accordance with another embodiment, there is provided an IC including: an internal configuration section adjustable by making use of pre-found adjusted data, a nonvolatile memory used for storing a result of a pre-adjustment process carried out on the internal configuration section to serve as the pre-found adjusted data and for storing correction data for another circuit, and an interface section having a data transfer function for transferring data read out from the nonvolatile memory as the pre-found adjusted data and the correction data to an external data recipient and having a data holding function for supplying to-be-actually-used adjusted data received from an external source to the internal configuration section.

In accordance with another embodiment, there is provided an electronic apparatus including: a first IC, a nonvolatile memory, and a second IC. The first IC includes an internal configuration section adjustable by making use of pre-found adjusted data, and a data holding section configured to supply to-be-actually used adjusted data received from an external source to the internal configuration section as the pre-found adjusted data. A nonvolatile memory is used for storing a result of a pre-adjustment process carried out on the internal configuration section of the first IC to serve as the pre-found adjusted data and for storing correction data for another circuit. A second IC includes, serving as an internal configuration section, a signal processing section connected with the data holding section of the first IC and the nonvolatile memory, and a correction-data supplying section configured to supply correction data to the other circuit. The signal processing section: receives the pre-found adjusted data read out from the nonvolatile memory, generates the to-be-actually-used adjusted data on the basis of the pre-found adjusted data and supplies the to-be-actually-used adjusted data to the data holding section, and receives the correction data read out from the nonvolatile memory, and supplies the correction data on the basis of the received correction data to the other circuit by way of the correction-data supplying section.

As described above, the nonvolatile memory included in the first IC provided by the embodiment is used for storing not only the pre-found adjusted data used for the first IC, but also the correction data for the other circuit. Then, as data read out from the nonvolatile memory, the signal processing section employed in the second IC receives not only the pre-found adjusted data used for the first IC, but also the correction data for the other circuit. Subsequently, the signal processing section in the second IC generates the to-be-actually-used adjusted data on the basis of the pre-found adjusted data for the first IC and supplies the to-be-actually-used adjusted data to the first IC.

In addition, the signal processing section employed in the second IC also adjusts the correction data received from the interface section before supplying the adjusted correction data to the correction-data supplying section of the second IC to be supplied to the other circuit.

In accordance with the present embodiment, the nonvolatile memory included in the first IC is used for storing not only the pre-found adjusted data used for adjusting the internal configuration section employed in the first IC, but also the correction data for the other circuit. It is thus unnecessary to provide a memory to be used for storing adjustment or correction data for every configuration section and every circuit which require that an adjustment or correction process be carried out. As a result, a plurality of configuration sections and other circuits can be adjusted or corrected by making use of adjustment or correction data stored in the nonvolatile memory with a high degree of efficiency.

Additional features and advantages are described herein, and will be apparent from the following Detailed Description and the figures.

BRIEF DESCRIPTION OF THE FIGURES

FIG. 3 is a diagram showing typical adjusted data in the front-end circuit IC of the TV-broadcast receiver as an electronic apparatus according to the embodiment;

FIGS. 7A to 7C are diagrams to be referred to in description of a first typical error-correction code process operated when the adjusted data is stored in a nonvolatile memory employed in an electronic apparatus according to the embodiment;

FIGS. 8A and 8B are diagrams to be referred to in description of a second typical error-correction code process operated when the adjusted data is stored in a nonvolatile memory employed in an electronic apparatus according to the embodiment;

FIGS. 9A and 9B are diagrams to be referred to in description of a third typical error-correction code process operated when the adjusted data is stored in a nonvolatile memory employed in an electronic apparatus according to the embodiment;

DETAILED DESCRIPTION

By referring to diagrams, the following description explains embodiments each implementing an electronic apparatus. To be more specific, a TV-broadcast receiver is taken as an example of the electronic apparatus.

Figure 1:
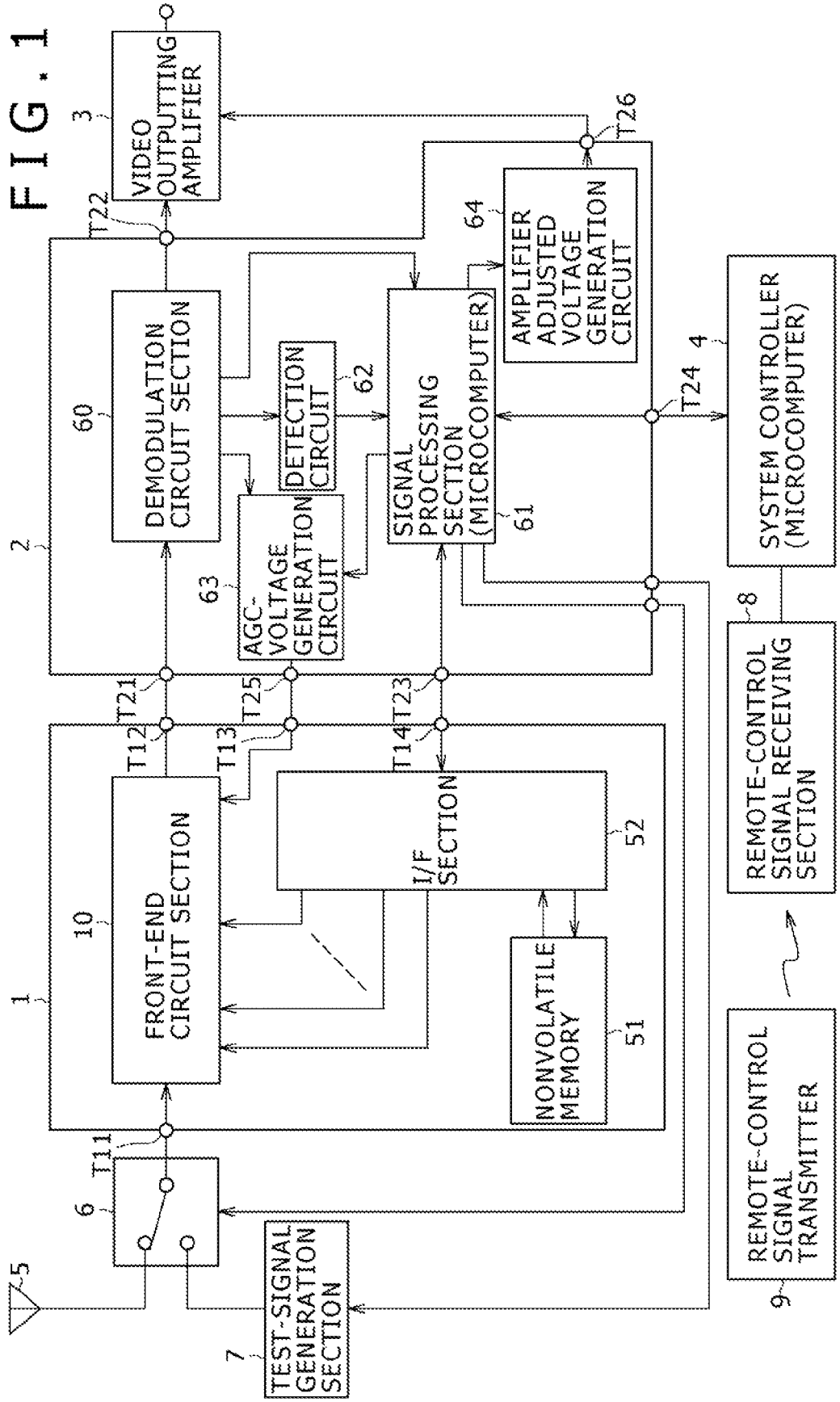
FIG. 1 is a block diagram showing a typical configuration of a TV-broadcast receiver taken as a typical electronic apparatus according to an embodiment.

FIG. 1 is a block diagram showing a typical configuration of a TV-broadcast receiver taken as a typical electronic apparatus according to an embodiment. The configuration of the TV-broadcast receiver according to an embodiment is made simple by making use of ICs. The main components composing the TV-broadcast receiver include a front-end circuit IC 1, a demodulation circuit IC 2, a video outputting amplifier 3 and a system controller 4 which has a microcomputer. The demodulation circuit IC 2 employs a signal processing section 61.

The system controller 4 is connected to a remote-control signal receiving section 8. The remote-control signal receiving section 8 receives a remote-control signal from a remote-control signal transmitter 9 and forwards the signal to the system controller 4. The system controller 4 analyzes the received remote-control signal in order to produce a result of determination as to what operation carried out by the user is represented by the signal. The system controller 4 then executes control in accordance with the result of the determination. Operations carried out by the user include an operation to turn on or off the power supply employed in the TV-broadcast receiver and an operation to change a channel assigned to a TV broadcasting station selected by the user.

A TV-broadcast signal received by a TV-broadcast signal receiving antenna 5 is supplied to the front-end circuit IC 1 by way of a switch circuit 6 and an antenna terminal pin T11. The TV-broadcast receiver according to the embodiment also includes a test-signal generation section 7 configured to generate a test signal to be used in calibration of a front-end circuit section 10 to be described later. The test signal generated by the test-signal generation section 7 is supplied to the front-end circuit IC 1 by way of the switch circuit 6 and the antenna terminal pin T11.

In this embodiment, in the event of a change of adjustment for any adjustment section employed in the front-end circuit section 10, the signal processing section 61 included in the demodulation circuit IC 2 automatically sets a calibration mode, in which a calibration process to be described later is carried out.

At the start of the calibration mode, the signal processing section 61 sets the switch circuit 6 to the test-signal generation section 7 and drives the test-signal generation section 7 to start generating the test signal. The test signal generated by the test-signal generation section 7 is a signal having a single special frequency. At the end of the calibration mode, on the other hand, the signal processing section 61 sets the switch circuit 6 to the TV-broadcast signal receiving antenna 5 in order to restore the TV-broadcast receiver to a state of receiving the TV-broadcast signal.

In this embodiment, the front-end circuit IC 1 includes a front-end circuit section 10 serving as a typical internal configuration section which can be adjusted by making use of adjusted data, a nonvolatile memory 51 used for storing pre-found adjusted data and an interface (I/F) section 52.

The front-end circuit section 10 has a plurality of adjustment sections described later. Each of the adjustment sections has an adjustment item or a plurality of adjustment items. The nonvolatile memory 51 is used for storing adjusted data found in advance for every adjustment item of each adjustment section employed in the front-end circuit section 10 before the TV-broadcast receiver is shipped from a factory. The adjusted data is stored as pre-found adjusted data. It is to be noted that the embodiment is configured to allow pre-found adjusted data to be added to the nonvolatile memory 51 at any time after the TV-broadcast receiver has been shipped from the factory.

The nonvolatile memory 51 is connected to the I/F section 52. The I/F section 52 is connected to the signal processing section (microcomputer) 61 of the demodulation circuit IC 2 through a terminal pin T14 of the front-end circuit IC 1. The signal processing section 61 will be described more later.

In this embodiment, in a process to acquire pre-found adjusted data, first of all, a tester is used for adjusting adjusted data in order to find data optimum for a value determined in advance for a variable parameter of each adjustment item of every adjustment section. An example of the varying parameter in this embodiment is the frequency of the reception channel assigned to a TV broadcasting station selected by the user. Then, the optimum adjusted data is supplied by the tester to the nonvolatile memory 51 by way of the signal processing section 61 to be stored in the nonvolatile memory 51 as the pre-found adjusted data associated with the parameter which is the frequency of the reception channel assigned to a TV broadcasting station selected by the user.

It is to be noted that the optimum adjusted data can also be supplied by the tester to the nonvolatile memory 51 by way of the I/F section 52 in place of the signal processing section 61 to be stored in the nonvolatile memory 51.

As will also be described later, in this embodiment, the pre-found adjusted data stored in the nonvolatile memory 51 to serve as optimum adjusted data determined in advance for values of parameters does not necessarily represent the frequencies of channels assigned to all selectable TV broadcasting stations. Instead, the pre-found adjusted data is stored in the nonvolatile memory 51 to serve as optimum adjusted data determined in advance for values of discrete parameters representing the frequencies of channels assigned to only some TV broadcasting stations. In this case, pre-found adjusted data to be used as optimum adjusted data determined in advance for the values of any parameter between the discrete parameters is found by carrying out an interpolation process such as linear interpolation based on the pre-found adjusted data stored in the nonvolatile memory 51 as will be described later.

It is assumed that, for example, the image interference elimination of a band-pass filter provided for the intermediate frequency band is taken as an adjustment item. In this case, for example, the image interference elimination is adjusted for two points, i.e., the maximum and minimum points, or more than two VCO frequencies in VHF high and/or low bands or the UHF band. Optimum adjusted data obtained as a result of the adjustment of the image interference elimination is stored in the nonvolatile memory 51 as the pre-found adjusted data associated with the parameter of each of the frequencies.

Then, as will be described later, in this embodiment, the pre-found adjusted data is stored in the nonvolatile memory 51 after being subjected to an error-correction encoding process carried out by the signal processing section 61.

It is to be noted that, in a process to store the pre-found adjusted data generated by the tester in the nonvolatile memory 51 by way of the I/F section 52, the pre-found adjusted data obtained as a result of the error-correction encoding process carried out by the tester is stored in the nonvolatile memory 51.

Some of the pre-found adjusted data stored in the nonvolatile memory 51 does not have to be changed to be usable for a parameter such as a frequency. Such pre-found adjusted data can be supplied to an adjustment section of the front-end circuit section 10 as it is to serve as to-be-actually-used adjusted data which is a result of the error-correction decoding process.

As described above, however, if pre-found adjusted data for a channel frequency used as a parameter is stored in the nonvolatile memory 51 for every parameter value, the number of pieces of pre-found adjusted data stored in the nonvolatile memory 51 undesirably becomes large. In order to solve this problem, the pre-found adjusted data is stored for the values of only discrete parameters only as explained above. Thus, in this case, the pre-found adjusted data is not adjusted data used for generating to-be-actually-used adjusted data to be supplied as it is to any adjustment section of the front-end circuit section 10. Instead, the pre-found adjusted data is merely basic adjusted data used in an interpolation process carried out by a signal processing section (microcomputer) employed in the demodulation circuit IC described later.

The pre-found adjusted data is read out from the nonvolatile memory 51 in accordance with a read request made by the signal processing section 61 employed in the demodulation circuit IC 2 by way of the I/F section 52. The I/F section 52 is provided with a function for transferring the pre-found adjusted data read out from the nonvolatile memory 51 in accordance with a read request to the signal processing section 61.

As will be described later, the signal processing section 61 generates the to-be-actually-used adjusted data on the basis of the pre-found adjusted data read out from the nonvolatile memory 51 and transfers the to-be-actually-used adjusted data to the front-end circuit IC 1. The I/F section 52 is provided with a function for receiving the to-be-actually-used adjusted data from the signal processing section 61 and storing the to-be-actually-used adjusted data in a register embedded in the I/F section 52 to be eventually supplied later to a variety of adjustment sections employed in the front-end circuit section 10.

The front-end circuit section 10 converts a received TV-broadcast signal into a signal having an intermediate frequency. Then, the front-end circuit section 10 supplies the signal having an intermediate frequency to the demodulation circuit IC 2 by way of a terminal pin T12.

In the TV-broadcast receiver according to this embodiment, the demodulation circuit IC 2 employs a demodulation circuit section 60, the signal processing section 61, a detection circuit 62, an AGC-voltage generation circuit 63 and an amplifier adjusted-voltage generation circuit 64. The demodulation circuit section 60 is a component for generating a video output signal from the signal having an intermediate frequency. As described earlier, the signal processing section 61 is a microcomputer for carrying out a variety of processes. The detection circuit 62 is a component for detected a result of a calibration process which is carried out in a calibration mode.

The front-end circuit section 10 supplies the signal having an intermediate frequency from front-end circuit IC 1 to the demodulation circuit section 60 by way of a terminal pin T21. The demodulation circuit section 60 demodulates the received intermediate-frequency signal in order to generate the video output signal. The demodulation circuit section 60 then supplies the video output signal to a video outputting amplifier 3 by way of a terminal pin T22.

The signal processing section 61 is connected to the I/F section 52 of the front-end circuit IC 1 by way of a terminal pin T23. The signal processing section 61 is also connected to the system controller 4 by way of a terminal pin T24. It is to be noted that, in the TV-broadcast receiver according to this embodiment, the pre-found adjusted data is sent to the signal processing section 61 through the terminal pin T14, and the signal processing section 61 performs an operation to write the data into the nonvolatile memory 51 through the I/F section 52.

In a calibration mode and a process of finding pre-found adjusted data, the detection circuit 62 detects a determination signal for determining whether or not to-be-actually-used adjusted data supplied to every adjustment section employed in the front-end circuit section 10 is optimum. Then, the detection circuit 62 supplies the detected determination signal to the signal processing section 61.

In a calibration mode, the signal processing section 61 supplies the value of optimum adjusted data generated on the basis of the determination signal to the I/F section 52 to be saved. Then, after the calibration mode has been ended, the signal processing section 61 sets the switch circuit 6 to the antenna 5. In addition, the signal processing section 61 also drives the test-signal generation section 7 to stop a process of generating a test signal.

The signal processing section 61 is provided with a function to make a request for read and write accesses to the nonvolatile memory 51 as well as a function to carry out an error correction decoding process on pre-found adjusted data received from the nonvolatile memory 51 in order to generate to-be-actually-used adjusted data. The function includes a function to generate to-be-actually-used adjusted data from pre-found adjusted data by carrying out an interpolation process making use of the pre-found adjusted data and a function to carry out a calibration process in order to generate optimum to-be-actually-used adjusted data as described above.

The AGC-voltage generation circuit 63 employed in the demodulation circuit IC 2 generates an AGC voltage, which is to be used for controlling a gain control circuit employed in the front-end circuit section 10, in accordance with an input signal supplied to the demodulation circuit section 60. In a calibration mode, the AGC-voltage generation circuit 63 generates an AGC voltage that causes the gain control circuit employed in the front-end circuit section 10 to produce a fixed gain. In this embodiment, the AGC-voltage generation circuit 63 is a PWM (Pulse Width Modulation) signal generation circuit.

In a calibration mode, the signal processing section 61 changes the operation thereof from a process of providing the AGC-voltage generation circuit 63 with an AGC control signal generated by the demodulation circuit section 60 to a process of providing the AGC-voltage generation circuit 63 with a control signal for the fixed gain. Then, the AGC-voltage generation circuit 63 generates an AGC voltage with a pulse width adjusted by the AGC control signal received from the signal processing section 61 and supplies the AGC voltage to the front-end circuit section 10 by way of a terminal pin T25 and a terminal pin T13. Thus, the TV-broadcast receiver is configured to execute control with the signal having an intermediate frequency as will be described later.

The amplifier adjusted-voltage generation circuit 64 generates an amplifier-gain control voltage to be supplied to the video outputting amplifier 3. In this embodiment, the amplifier adjusted-voltage generation circuit 64 is also a PWM signal generation circuit.

A video output signal generated by the video outputting amplifier 3 is an analog signal. As a required property of the video output signal, the level of the video output signal must be accurate. However, since a variety of variations exist, the level of the video output signal generated by the video outputting amplifier 3 may not be accurate in some cases. The variations include variations of the demodulation circuit IC 2, variations of the video outputting amplifier 3 and variations of resistors employed in a variety of circuits. The variations of the demodulation circuit IC 2 include variations of a D/A converter employed in the demodulation circuit IC 2 and variations of a power-supply voltage used in the demodulation circuit IC 2.

In the past, in the case of the TV-broadcast receiver, a variable-resistance resistor is installed in the video outputting amplifier 3 to serve as a resistor for adjusting the level of the video output signal generated by the video outputting amplifier 3 to a value in a prescribed value range. In consequence, the existing TV-broadcast receiver raises the component cost of the variable-resistance resistor and an adjustment cost of entailing time and labor which are required for adjusting the resistance of the variable-resistance resistor.

In order to solve the problems raised by the existing TV-broadcast receiver as described above, a variable-gain amplifier is employed as the video outputting amplifier 3 and the demodulation circuit IC 2 is provided with a PWM signal generation circuit serving as the amplifier adjusted-voltage generation circuit 64 as explained earlier. The amplifier adjusted-voltage generation circuit 64 receives adjusted data, which is used for controlling the pulse width of a PWM signal to be generated by the amplifier adjusted-voltage generation circuit 64 to serve as an amplifier-gain control voltage, from the signal processing section 61. The amplifier adjusted-voltage generation circuit 64 generates the PMW signal with the pulse width thereof controlled by the adjusted data received from the signal processing section 61 and supplies the PWM signal to the video outputting amplifier 3 by way of a terminal pin T26 to be used as the amplifier-gain control voltage. In this way, the level of the video output signal generated by the video outputting amplifier 3 is controlled to a value in the prescribed value range.

In this embodiment, the adjusted data supplied by the signal processing section 61 to the amplifier adjusted-voltage generation circuit 64 has been stored in the nonvolatile memory 51 employed in the front-end circuit IC 1. That is to say, the signal processing section 61 acquires the adjusted data for controlling the gain of the video outputting amplifier 3 from the nonvolatile memory 51 and supplies the acquired adjusted data to the amplifier adjusted-voltage generation circuit 64.

The adjusted data for controlling the gain of the video outputting amplifier 3 is found through adjustment of the video output signal generated by the video outputting amplifier 3 to a value in the prescribed value range by making use of a tester before the TV-broadcast receiver is shipped from a factory. Then, the adjusted data for controlling the gain of the video outputting amplifier 3 is stored in the nonvolatile memory 51 along with the adjusted data provided for the front-end circuit IC 1 as described earlier also before the TV-broadcast receiver is shipped from a factory which manufactures the TV-broadcast receiver.

That is, in this embodiment, the nonvolatile memory 51 employed in the front-end circuit IC 1 is used for storing not only the adjusted data used for adjusting the internal configuration sections employed in the front-end circuit IC 1, but also the adjusted data used as correction data for another circuit. In addition, in this embodiment, the demodulation circuit IC 2 is provided with a microcomputer functioning as the signal processing section 61 which is capable of acquiring all the adjusted data stored in the nonvolatile memory 51. On top of that, the signal processing section 61 carries out predetermined processing on each piece of acquired adjusted data if the predetermined processing is required for the piece of adjusted data, and supplies the result of the predetermined processing to a subject member that requires the result of the predetermined processing.

Other circuits requiring adjusted data obtained as a result of the predetermined processing include not only the video outputting amplifier 3, but also other circuits not included in the front-end circuit IC 1. Adjusted data obtained as a result of the predetermined processing as adjusted data for the other circuits not included in the front-end circuit IC 1 can also be stored in the nonvolatile memory 51. The signal processing section 61 appends information to the result of the predetermined processing to serve as information used for indicating whether the result of the predetermined processing is adjusted data for the front-end circuit section 10, the video outputting amplifier 3 or another circuit not included in the front-end circuit IC 1.

Typical Concrete Example of the Front-End Circuit IC 1

Figure 2:
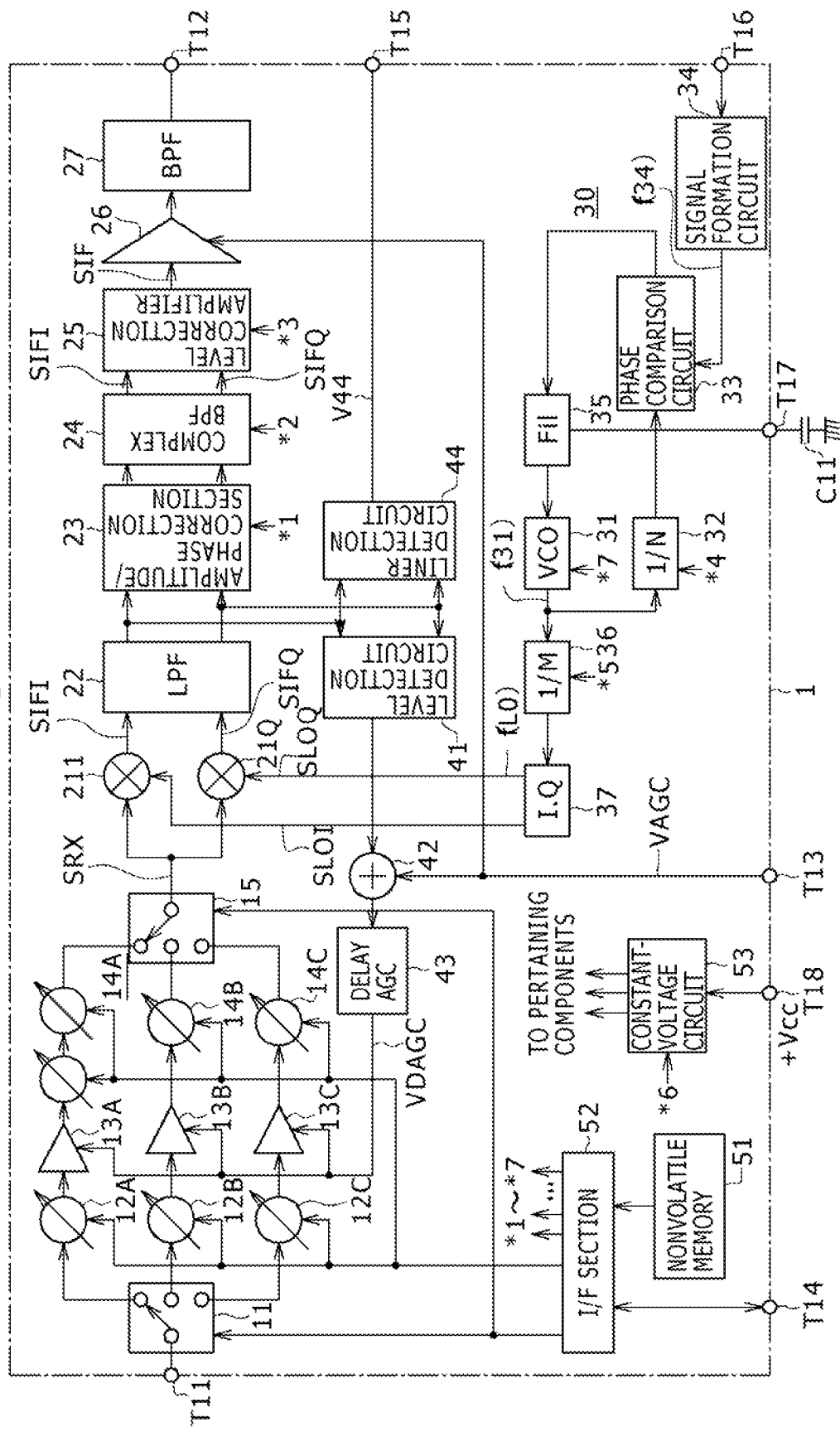
FIG. 2 is an explanatory block diagram to be referred to in describing a typical concrete example of a front-end circuit employed in a TV-broadcast receiver according to the embodiment.

FIG. 2 is an explanatory block diagram referred to in describing a typical concrete example of the front-end circuit IC 1 according to the embodiment with particular reference to details of the front-end circuit section 10 employed in the front-end circuit IC 1.

Frequencies used in TV broadcasting to represent channels each assigned to a TV broadcasting station vary from country to country. In addition, there are a variety of color systems such as NTSC (National Television System Committee), the PAL (Phase Alternating Line), the SECAM (Séquentiel couleur à mémoire) systems. On top of that, the TV broadcasting may be analog or digital broadcasting.

In such cases, the system for receiving signals of TV broadcasts can be conceivably divided into a front-end circuit and a baseband processing circuit. The front-end circuit is a circuit for receiving a TV broadcast and outputting an intermediate-frequency signal representing the TV broadcast. On the other hand, the baseband processing circuit is a circuit for processing the intermediate-frequency signal, which is output by the front-end circuit, in order to generate a color video signal and an audio signal associated with the color video signal. In this way, it is possible to cope with differences in TV-broadcasting system.

FIG. 2 is a diagram mainly showing details of a typical front-end circuit section 10 capable of receiving TV broadcasts of different countries without regard to what broadcasting system is adopted in transmitting each of the TV broadcasts. In this typical front-end circuit section 10, the frequencies used for transmitting the TV broadcasts divided into three reception bands as follows:

(A): 46 to 147 MHz (referred to as a VHF-L band)
(B): 147 to 401 MHz (referred to as a VHF-H band)
(C): 401 to 887 MHz (referred to as a UHF band)]

In each of the reception bands, the frequency to be used can be changed in accordance with an object channel in each of the reception bands A block 1 enclosed by a dashed line shown in the diagram of FIG. 2 compose the front-end circuit IC 1 which is a single chip as described so far.

The TV-broadcast signal receiving antenna 5 receives the signal of a TV broadcast and supplies the TV-broadcast signal to a switch circuit 11 by way of the antenna terminal pin T11. The switch circuit 11 selects one of antenna tuning circuits 12A, 12B and 12C, passing on the TV-broadcast signal to the selected antenna tuning circuit 12. The antenna tuning circuits 12A, 12B and 12C are provided respectively for the reception bands (A), (B) and (C) listed above. Each specific one of the antenna tuning circuits 12A, 12B and 12C is configured to be usable for selecting a tuning frequency assigned to a desired channel from a reception band assigned thereto by changing the capacitance of a tuning capacitor included in the specific antenna tuning circuit 12 in accordance with digital data so that, as a result, the antenna tuning circuit 12 is tuned to a reception signal having the tuning frequency assigned to a desired channel.

Then, a reception signal output by one of the antenna tuning circuits 12A, 12B and 12C is supplied to a switch circuit 15 by way of one of high-frequency amplifier circuits 13A, 13B and 13C as well as one of inter-stage tuning circuits 14A, 14B and 14C. The switch circuit 15 is switched being interlocked with the switch circuit 11. Thus, the switch circuit 15 outputs a desired received signal SRX having a frequency in a reception band assigned to one of the inter-stage tuning circuits 14A, 14B and 14C. The switch circuit 15 supplies the received signal SRX to mixer circuits 21I and 21Q.

It is to be noted that, although also the inter-stage tuning circuits 14A to 14C are formed similarly to the antenna tuning circuits 12A to 12C, the inter-stage tuning circuit 14A is formed as a detuning circuit. Further, as hereinafter described, the tuning capacitors of the tuning circuits 12A to 12C and 14A to 14C are built in the IC 1, but the tuning coils are provided externally of the IC 1.

A VCO (Voltage Controlled Oscillator) 31 generates an oscillation signal having a frequency determined in advance. Used for generating such an oscillation signal, the VCO 31 is a portion of a PLL 30. The oscillation signal generated by the VCO 31 is supplied to a variable-frequency circuit 32 which divides the frequency of the oscillation signal by N where N is a positive integer representing a frequency division ratio. That is to say, the variable-frequency circuit 32 generates a signal having a frequency equal to 1/N times the frequency of the oscillation signal. The variable-frequency circuit 32 outputs the signal having a divided frequency to a phase comparison circuit 33. Further, an external source supplies a clock signal having a frequency in the range 1 to 2 MHz to a signal formation circuit 34 by way of a terminal pin T16. The signal formation circuit 34 also divides the frequency of the clock signal in order to generate an output signal with a frequency f34 determined in advance and supplies the output signal to the phase comparison circuit 33 to serve as a reference signal.

Then, a comparison output produced by the phase comparison circuit 33 is supplied to a filter 35. The comparison output represents a difference in phase between the signals output by the variable-frequency circuit 32 and the signal formation circuit 34. The filter 35 outputs a direct current (DC) voltage with a level varying in accordance with the difference in phase to the VCO 31 to serve as a voltage for controlling the frequency f31 of the oscillation signal generated by the VCO 31. It is to be noted that a capacitor C11 externally attached to the front-end circuit IC 1 is connected to the filter 35 through a terminal pin T17 to serve as a smoothing capacitor.

Thus, the frequency f31 of the oscillation signal generated by the VCO 31 is expressed by the following equation:

$$f31 = N \cdot f34 \qquad \text{(equation 2)}$$

Since the system controller 4 is capable of controlling the frequency division ratio N through the signal processing section 61, the frequency f31 of the oscillation signal generated by the VCO 31 can be changed. Determined in accordance with the reception band and the reception frequency assigned to a reception channel, the frequency f31 of the oscillation signal generated by the VCO 31 has a typical value in the range 1.8 to 3.6 GHz.

Then, the VCO 31 supplies the oscillation signal to a variable-frequency circuit 36 which divides the oscillation frequency f31 by a frequency division ratio M having a typical value of 2, 4, 8, 16 or 32. The system controller 4 is also capable of controlling the frequency division ratio M of the variable-frequency circuit 36 through the signal processing section 61.

The variable-frequency circuit 36 supplies the signal having a divided frequency to a frequency division circuit 37 which further divides the divided frequency by two or multiplies the divided frequency by ½ in order to generate divided-frequency signals SL0I and SL0Q having phases orthogonal to each other. The frequency division circuit 37 supplies the divided-frequency signals SL0I and SL0Q to the mixer circuits 21I and 21Q respectively to be used as local oscillation signals.

Let reference notation fL0 denote the frequency of the local oscillation signals SL0I and SL0Q. The frequency fL0 of the local oscillation signals SL0I and SL0Q is expressed by the following equation:

$$\begin{aligned} fL0 &= f31/(2M) \qquad \text{(equation 3)} \\ &= N \cdot f34/(2M) \\ &= f34 \cdot N/(2M) \end{aligned}$$

Thus, by changing the frequency division ratios M and N, the frequency fL0 of the local oscillation signals SL0I and SL0Q can be varied in a wide range to values separated from each other by a frequency step which can be determined in advance.

Let reference notation SRX denote the reception signal of a desired channel whereas reference notation SUD (Signal UnDesired) denote an image interference signal. For the sake of simplicity, the reception signal SRX of a desired channel is expressed by the following equation:

$$SRX = ERX \cdot \sin \omega RXt$$

In the above equation, reference notation ERX denotes the amplitude of the reception signal SRX of a desired channel whereas the expression ωRX is represented by the following equation:

$$\omega RX = 2\pi fRX$$

In the above equation, reference notation fRX denotes the center frequency of the reception signal SRX of a desired channel.

On the other hand, the image interference signal SUD is expressed by the following equation:

$$SUD = EUD \cdot \sin \omega UDt$$

In the above equation, reference notation EUD denotes the amplitude of the image interference signal whereas the expression ωUD is represented by the following equation:

$$\omega UD = 2\pi fUD$$

In the above equation, reference notation fUD denotes the center frequency of the image interference signal.

On the other hand, the local oscillation signals SL0I and SL0Q are expressed by the following equations:

$$SL0I = EL0 \cdot \sin \omega L0t$$

$$SL0Q = EL0 \cdot \cos \omega L0t$$

In the above equations, reference notation EL0 denotes the amplitude of the local oscillation signals SL0I and SL0Q whereas the expression ωL0 is represented by the following equation:

$$\omega L0 = 2\pi fL0$$

By the same token, an expression ωIF is represented by the following equation:

$$\omega IF = 2\pi fIF$$

In the above equation, reference notation fIF denotes the intermediate frequency which has a typical value in the range 4.0 to 5.5 MHz. The intermediate frequency fIF can be changed in accordance with the broadcasting system. In the case of the upper heterodyne system, the following equations are satisfied:

$$fRX = fL0 - fIF$$

$$fUD = fL0 + fIF$$

Thus, the mixer circuits 21I and 21Q output respectively signals SIFI and SIFQ which are expressed by the following equations:

$$\begin{aligned}
SIFI &= (SRX + SUD) \times SL0I \\
&= ERX \cdot \sin \omega RXt \times EL0 \cdot \sin \omega L0t + EUD \cdot \sin \omega UDt \times \\
&\quad EL0 \cdot \sin \omega L0t \\
&= \alpha\{\cos(\omega RX - \omega L0)t - \cos(\omega RX + \omega L0)t\} + \\
&\quad \beta\{\cos(\omega UD - \omega L0)t - \cos(\omega UD + \omega L0)t\}
\end{aligned}$$

-continued $$\begin{aligned}
SIFQ &= (SRX + SUD) \times SL0Q \\
&= ERX \cdot \sin \omega RXt \times EL0 \cdot \cos \omega L0t + EUD \cdot \sin \omega UDt \times \\
&\quad EL0 \cdot \cos \omega L0t \\
&= \alpha\{\sin(\omega RX + \omega L0)t + \sin(\omega RX - \omega L0)t\} + \\
&\quad \beta\{\sin(\omega UD + \omega L0)t + \sin(\omega UD - \omega L0)t\}
\end{aligned}$$

$$\alpha = ERX \cdot EL0 / 2$$
$$\beta = EUD \cdot EL0 / 2$$

The signals SIFI and SIFQ are supplied to a low pass filter 22 which has a band broader than the width of a band occupied by the video intermediate-frequency signal and the audio intermediate-frequency signal. A typical width of the band occupied by the video intermediate-frequency signal and the audio intermediate-frequency signal is in the range 6 to 8 MHz. As a result, the low pass filter 22 eliminates signal components having angular frequencies equal to a sum of angular frequencies (ωRX+ωL0) and a sum of angular frequencies (ωUD+ωL0). In addition, the low pass filter 22 also eliminates the local oscillation signals SL0I and SL0Q. That is to say, the low pass filter 22 outputs signals SIFI and SIFQ which are expressed by the following equations:

$$\begin{aligned}
SIFI &= \alpha \cdot \cos(\omega RX - \omega L0)t + \beta \cdot \cos(\omega UD - \omega L0)t \quad \text{(equation 4)} \\
&= \alpha \cdot \cos \omega IFt + \beta \cdot \cos \omega IFt
\end{aligned}$$

$$\begin{aligned}
SIFQ &= \alpha \cdot \sin(\omega RX - \omega L0)t + \beta \cdot \sin(\omega UD - \omega L0)t \quad \text{(equation 5)} \\
&= -\alpha \cdot \sin \omega IFt + \beta \cdot \sin \omega IFt
\end{aligned}$$

Then, the signals SIFI and SIFQ are supplied to a complex band pass filter 24 also referred to as a poly-phase band pass filter provided for intermediate frequencies by way of an amplitude/phase correction circuit 23 to be described later. The complex band pass filter 24 has characteristics (a) to (d) which are described as follows:

(a) It has a frequency characteristic of a band-pass filter.

(b) It has a phase shifting characteristic and shifts the phase of the signal SIFI by a value φ which is an arbitrary displacement.

(c) It shifts the phase of the signal SIFQ by a displacement (φ−90°) similarly.

(d) It has two band-pass characteristics which have a frequency f0 and another frequency −f0, which are symmetrical with respect to the zero frequency on a frequency axis, as the center frequencies thereof, and one of the two band-pass characteristics can be selected by a relative phase between the input signals.

Thus, in accordance with the characteristics (b) and (c) described above, the phase of the signal SIFQ has a phase lagging behind the phase of the signal SIFI by a difference of 90 degrees as shown by the following equations:

$$SIFI = \alpha \cdot \cos \omega IFt + \beta \cdot \cos \omega IFt \quad \text{(equation 6)}$$

$$\begin{aligned}
SIFQ &= -\alpha \cdot \sin(\omega IFt - 90°) + \beta \cdot \sin(\omega IFt - 90°) \quad \text{(equation 7)} \\
&= \alpha \cdot \cos \omega IFt - \beta \cdot \cos \omega IFt
\end{aligned}$$

In short, in the signal SIFI and the signal SIFQ, the signal components α·cos ωIFt have the same phase with each other whereas the signal components β·coc ωIFt have phases opposite to each other.

Then, the complex band pass filter 24 provided for intermediate frequencies supplies the signals SIFI and SIFQ to a level correction amplifier 25 which finds the sum of the signals SIFI and SIFQ in order to generate a signal SIF expressed by the following equation:

$$SIF = SIFI + SIFQ \quad \text{(equation 8)}$$
$$= 2\alpha \cdot \cos\omega IFt$$
$$= ERX \cdot EL0 \cdot \cos\omega IFt$$

The signal SIF is no other than an intermediate-frequency signal which is obtained when the signal SRX is received by adoption of the upper heterodyne method. In addition, the intermediate-frequency signal SIF does not include the image interference signal SUD. It is to be noted that the amplitude/phase correction circuit 23 corrects the amplitude and phase of the signal SIFI as well as the amplitude and phase of the signal SIFQ so that equation 8 is well satisfied, that is, the magnitude of the image interference signal SUD is minimized.

In addition, at that time, the level correction amplifier 25 corrects the level of the intermediate-frequency signal SIF so that an AGC characteristic and the like do not change even of the levels of the signals SIFI and SIFQ vary due to differences between broadcasting systems. In particular, the AGC characteristic includes the AGC start level.

Finally, the level correction amplifier 25 outputs the intermediate-frequency signal SIF to a terminal pin T12 by way of a AGC variable-gain amplifier 26 and a band pass filter 27 for removing a DC component and aliasing.

Thus, by changing the frequency division ratios M and N, the frequency of a desired channel can be selected as indicated by equation 3. Then, by demodulating the intermediate-frequency signal SIF output to the demodulation circuit IC 2 by way of the terminal pin T12 in accordance with the broadcasting system, it is possible to watch a broadcast received through the desired channel.

As described above, by virtue of the front-end circuit section 10, the front-end circuit IC 1 created as a single IC is capable of handling signals having frequencies in a broad range of 46 to 887 MHz. In addition, the front-end circuit section 10 can be implemented by making use of fewer components without deteriorating a characteristic of eliminating image interferences over the broad frequency range. On top of that, a single front-end circuit section 10 is capable of coping with differences between the digital and analog broadcasting systems as well as differences between broadcasting systems adopted by countries in the world.

In addition, the number of interferences caused by high-frequency components of the clock signal and the like can be reduced. As a result, the reception sensitivity can be improved. On top of that, the PLL 30 can be implemented by circuit components which are created internally in the front-end circuit IC 1 except a capacitor C11. Thus, the PLL 30 is proof against disturbances and generates only few interferences. In addition, since the high-frequency amplifier circuits 13A, 13B and 13C are connected to only the tuning circuits 14A, 14B and 14C respectively, the loads borne by the high-frequency amplifier circuits 13A, 13B and 13C can be reduced so that the high-frequency amplifier circuits 13A, 13B and 13C generate only few distortions.

AGC Example

An AGC voltage VAGC is generated by an AGC-voltage generation circuit 63 employed in the demodulation circuit IC 2 to be described later as an IC provided at a stage following the front-end circuit IC 1. The AGC voltage VAGC is supplied to the AGC variable-gain amplifier 26 by way of a terminal pin T13 to serve as a signal for controlling the gain of the AGC variable-gain amplifier 26. Thus, ordinary AGC is executed as AGC for the signal having an intermediate frequency.

In addition, if the level of the desired received signal SRX is too high and/or an interference signal with a high level is mixed with the received signal SRX, the ordinary AGC described above cannot be executed. In order to solve this problem, the signals SIFI and SIFQ generated by the low pass filter 22 are supplied to a level detection circuit 41 which detects the levels of the signals SIFI and SIFQ prior to execution of the AGC in order to determine whether or not either of the levels exceeds a value determined in advance, and generates a detection signal representing the result of the detection. The detection signal generated by the level detection circuit 41 is supplied to an adder 42 along with the AGC voltage VAGC received from a terminal pin T15. The adder 42 generates an addition output signal representing the result of adding the detection signal to the AGC voltage VAGC, and supplies the addition output signal to a delay AGC voltage formation circuit 43 which then generates a delay AGC voltage VDAGC. The delay AGC voltage formation circuit 43 supplies the delay AGC voltage VDAGC to each of the high-frequency amplifier circuits 13A, 13B and 13C to serve as a control signal in order to execute delayed AGC.

Thus, since an optimum AGC operation can be carried out on the basis of a D/U, a desired broadcast signal can be well received without regard to whether the broadcasting is analog or digital broadcasting or even if the broadcasting is mixed analog and digital broadcasting. The D/U (Desired/Undesired) is defined as a ratio of the strength of a desired reception signal to the strength of each of many undesired signals.

Typical Voltages for Testing and Adjustment

The signals SIFI and SIFQ generated by the low pass filter 22 are supplied to a linear detection circuit 44 which then detects and smoothes the levels of the signals SIFI and SIFQ in order to generate a DC voltage V44 representing the levels of the signals SIFI and SIFQ. The linear detection circuit 44 then outputs the DC voltage V44 to the terminal pin T15.

The DC voltage V44 output to the terminal pin T15 is used in processes of testing and adjusting the front-end circuit IC 1. For example, the DC voltage V44 output to the terminal pin T15 is used in a process of checking the level of the input signal received by the front-end circuit IC 1 over a broad range of frequencies. Thus, unlike a signal output by an intermediate-frequency filter having a narrow band, it is possible to directly check an attenuation frequency of a broad-band for signal lines connecting components provided in range starting with the antenna terminal pin T11 and ending with the mixer circuits 21I and 21Q.

In addition, in a process to adjust the antenna tuning circuits 12A to 12C and the inter-stage tuning circuits 14A to 14C, a test signal is supplied to the antenna terminal pin T11 whereas the AGC voltage VAGC supplied to the terminal pin T13 is set at a level determined in advance so as to allow a tracking adjustment operation to be carried out on the basis of variations in DC voltage V44. On top of that, by making use of digital data, it is possible to adjust a variety of functions of the front-end circuit IC 1 and measure characteristics of the front-end circuit IC 1.

Constant-Voltage Circuit

The front-end circuit IC 1 according to this embodiment is provided with a constant-voltage circuit 53 which receives a power-supply voltage +Vcc from a terminal pin T18. The constant-voltage circuit 53 is a component for generating a constant voltage having a magnitude determined in advance from the power-supply voltage +Vcc by making use of a band gap of a PN junction. The constant-voltage circuit 53 supplies the constant voltage generated thereby to a variety of circuits employed in the front-end circuit IC 1. It is to be noted that the constant voltage generated by the constant-voltage circuit 53 can be adjusted finely on the basis of adjusted data stored in advance in the nonvolatile memory 51. The signal processing section 61 acquires the adjusted data used for finely adjusting the constant voltage generated by the constant-voltage circuit 53 from the nonvolatile memory 51 and generates to-be-actually-used adjusted data. Then, the signal processing section 61 supplies the to-be-actually-used adjusted data to the constant-voltage circuit 53 by way of the I/F section 52 to be used in setting the constant voltage generated by the constant-voltage circuit 53 at a proper level.

Thus, the constant voltage output by the constant-voltage circuit 53 is a constant voltage finely adjusted for every front-end circuit IC 1. Thus, even if each of the circuits employed in the front-end circuit IC 1 is constructed by making use of MOS-FETs, the power-supply voltage supplied to each of the circuits can be set at a level slightly higher than required, allowing the performance of each of the circuits to be displayed to the maximum extent possible.

In accordance with the configuration of the front-end circuit IC 1 shown in the block diagram of FIG. 2, it is possible to receive TV broadcasts in the frequency band 46 to 887 MHz prescribed as the reception bands (A) to (C) described earlier. In addition, the configuration of the front-end circuit IC 1 also allows the center frequency and pass bandwidth of the complex band pass filter 24 provided for intermediate frequencies to be changed so that the TV-broadcast receiver is capable of receiving not only ground digital and analog TV broadcasts originated domestically, but also ground digital and analog TV broadcasts originated from other countries.

Typical Adjustment Data Stored in the Nonvolatile Memory 51

FIG. 3 is a diagram showing typical adjusted data stored in the nonvolatile memory 51 in accordance with this embodiment. Also as described above, the nonvolatile memory 51 is used for storing not only adjusted data for adjusting a variety of adjustment sections employed in the front-end circuit IC 1 itself, but also adjusted data of circuits not included in the front-end circuit IC 1.

First of all, the adjusted data for adjusting a variety of adjustment sections employed in the front-end circuit IC 1 is explained.

Tracking-filter adjusted data is data used for adjusting filter pass bands of the antenna tuning circuits 12A to 12C and the inter-stage tuning circuits 14A to 14C. This tracking-filter adjusted data is used for compensating the antenna tuning circuits 12A to 12C and the inter-stage tuning circuits 14A to 14C for variations of embedded capacitors and externally installed coils. In the typical adjusted data shown in the diagram of FIG. 3, the adjusted data is information to be set as the maximum frequency of the band for a filter of each of the antenna tuning circuits 12A to 12C and the inter-stage tuning circuits 14A to 14C.

IQ-amplitude adjusted data and IQ-phase adjusted data are used for adjusting characteristics of an intermediate-frequency filter and, in particular, used for adjusting an image-interference removal characteristic. Each of the IQ-amplitude adjusted data and the IQ-phase adjusted data is adjusted data for each of a plurality of reception channel frequencies for each of the three reception bands described before. That is to say, each of the IQ-amplitude adjusted data and the IQ-phase adjusted data is adjusted data provided for a reception channel frequency which is a variable parameter. To be more specific, each adjusted data is stored for each of a plurality of discrete reception channel frequencies to be described below.

In detail, in this embodiment, the discrete reception channel frequencies for which each of the adjusted data is stored do not imply all reception channel frequencies in each of the three reception bands. Instead, the discrete reception channel frequencies are separated from each other by a plurality of skipped reception channel frequencies. In consequence, for each of the skipped reception channel frequencies, each adjusted data is not stored in the nonvolatile memory 51. However, the signal processing section 61 is capable of finding each adjusted data for a skipped reception channel frequency by carrying out an interpolation process based on data stored in the nonvolatile memory 51 as respectively the IQ-amplitude adjusted data and the IQ-phase adjusted data provided for some discrete reception channel frequencies. The configuration is applied to other adjusted data described as follows.

VCO-current adjusted data is adjusted data used for absorbing current variations caused by variations of the resistance of a resistor employed in the VCO 31 so as to realize a stable performance all the time.

IF-BPF cutoff-frequency adjusted data is adjusted data used for setting the cutoff frequencies of the complex band pass filter 24. The IF-BPF cutoff-frequency adjusted data absorbs variations of the capacitance of an internal capacitor and variations of the resistance of an internal resistor in the complex band pass filter 24. The IF-BPF cutoff-frequency adjusted data can also be used for changing the cutoff frequencies of the complex band pass filter 24.

In this embodiment, the IF-BPF cutoff-frequency adjusted data is adjusted data used for setting the aforementioned cutoff frequencies which correspond to bandwidths BW of 6 MHz, 7 MHz and 8 MHz for the three reception bands described earlier.

Tuning-frequency setting adjusted data is pre-found adjusted data used for adjusting the setting of the tuning frequencies of the antenna tuning circuits 12A to 12C and the inter-stage tuning circuits 14A to 14C. The tuning-frequency setting adjusted data is also stored for a plurality of reception channel frequencies Level-correction-amp adjusted data is adjusted data for adjusting the gain of the level correction amplifier 25. The level-correction-amp adjusted data absorbs variations of the resistance of a resistor employed in the level correction amplifier 25.

Regulator-voltage setting adjusted data is adjusted data for finely adjusting a voltage output by the constant-voltage circuit 53

Next, the adjusted data provided for circuit sections not included in the front-end circuit IC 1 is explained. In this embodiment, an example of the adjusted data is stored in the nonvolatile memory 51 to serve as adjusted data for adjusting the gain of the video outputting amplifier 3. If necessary, the adjusted data can be stored in the nonvolatile memory 51 for each of a plurality of reception channel frequencies.

Operation to Store Adjusted Data (Including Error-Correction Encoding Process)

Figure 4:
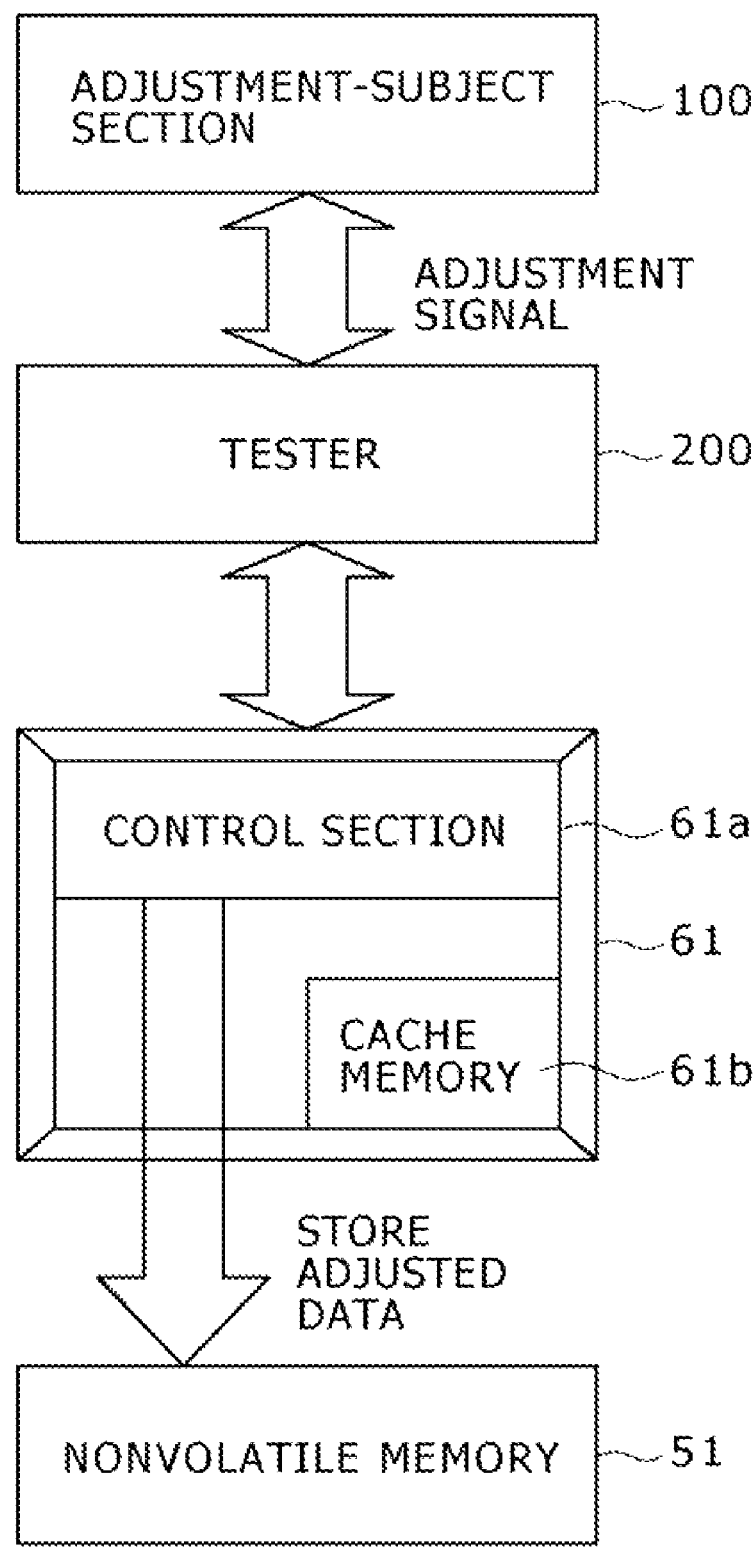
FIG. 4 is an explanatory conceptual diagram to be referred to in description of an operation to store the data in a nonvolatile memory employed in an electronic apparatus according to the embodiment.

FIG. 4 is an explanatory conceptual diagram referred to in description of an operation to acquire adjusted data and store the data in the nonvolatile memory 51.

In the explanatory conceptual diagram of FIG. 4, an adjustment-subject section 100 is any one of adjustment sections such as a tuning circuit, a band pass filter and an amplifier which are employed in the front-end circuit section 10 described before. As explained earlier, before shipping the TV-broadcast receiver according to the embodiment from a factory manufacturing the TV-broadcast receiver, a tester 200 is used to adjust a variety of adjustment items for a variety of adjustment sections represented by the adjustment-subject section 100 in order to generate adjusted data for each of the adjustment items set for each of the adjustment sections. To put it in detail, for each adjustment item, the tester 200 acquires adjusted data which is optimum adjusted data obtained as a result of the adjustment process. The optimum adjusted data is adjusted data obtained in an optimum state detected in the adjustment process. The optimum adjusted data acquired by the tester 200 in the optimum state is referred to as a pre-found adjusted data. For example, an adjustment item may be subjected to an adjustment process to result in adjusted data for one of a plurality of reception channel frequencies as described before. In this case, for every reception channel frequency, an adjustment item is subjected to an adjustment process in order to generate adjusted data and optimum adjusted data obtained in an optimum state detected in the adjustment process is acquired for each reception item to be used as pre-found adjusted data.

The pre-found adjusted data acquired by the tester 200 is supplied to the nonvolatile memory 51 by way of the signal processing section 61 employed in the demodulation circuit IC 2 to be stored in the nonvolatile memory 51. The signal processing section 61 carries out an error-correction coding process on the pre-found adjusted data received from the tester 200 and stores the result of the error-correction coding process in the nonvolatile memory 51. To put it in detail, a CPU 61a employed in the signal processing section 61 to function as a controller executes software in order to carry out the error-correction coding process.

Figure 5:
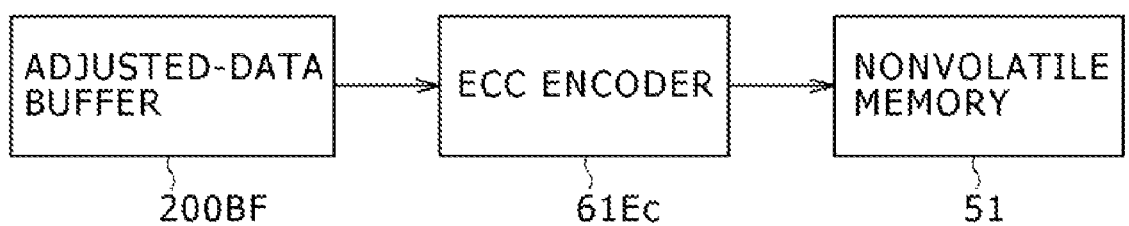
FIG. 5 is an explanatory conceptual diagram to be referred to in description of a process operated when the adjusted data is stored in a nonvolatile memory employed in an electronic apparatus according to the embodiment.

That is to say, as shown in a diagram of FIG. 5, the pre-found adjusted data stored in an adjusted-data buffer 200BF employed in the tester 200 is supplied to an ECC (error-correction coding) encoder 61Ec employed in the signal processing section 61.

In this embodiment, the ECC encoder 61Ec generates RS (Reed-Solomon) codes on the GF ($2^8$) for the pre-found adjusted data received from the adjusted-data buffer 200BF and adds the codes to the adjusted data. Then, in accordance with a command from the signal processing section 61, the pre-found adjusted data added with RS code by the ECC encoder 61Ec is supplied to the nonvolatile memory 51 by way of the I/F section 52.

Figure 6:
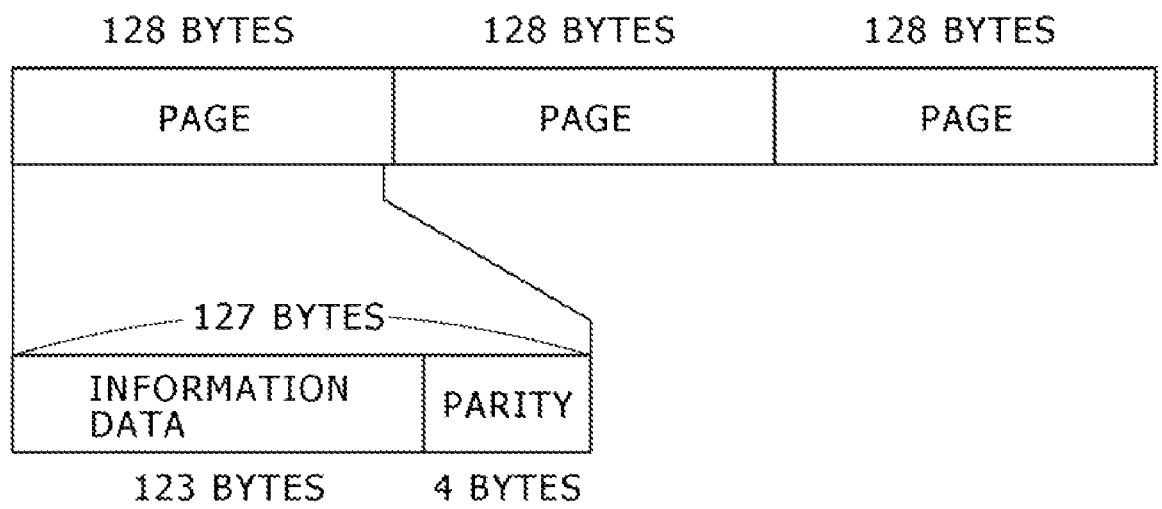
FIG. 6 is a diagram showing a format of adjusted data to be stored in a nonvolatile memory in an electronic apparatus according to the embodiment.

FIG. 6 is a diagram showing the format of the RS codes used in this embodiment. As shown in the diagram, in this embodiment, the adjusted data is data having a size of 3 pages each have a length of 128 bytes. Thus, the pre-found adjusted data has a size of 384 bytes. In this embodiment, an RS code is applied to 127 bytes of each of the pages. In this embodiment, the RS code is a code capable of correcting errors of up to 2 bytes. The structure of the 127 bytes to which an RS code is applied consists of adjusted data used as information data having a length of 123 bytes and 4 parity bytes.

It is to be noted, however, that the pre-found adjusted data is stored in the nonvolatile memory 51 not by dividing the adjusted data into the three pages for each adjustment item. Instead, the pre-found adjusted data for all adjustment items is divided into the three pages to each of which an error correction code is added before the adjusted data is stored in the nonvolatile memory 51.

The three pages of the adjusted data are referred to as macrodata. The signal processing section 61 acquires the pre-found adjusted data from the nonvolatile memory 51 in macrodata units. Then, the controller 61a employed in the signal processing section 61 supplies a macrodata unit of the adjusted data to an error-correction decoder which is a section included in the signal processing section 61 to serve as a section for carrying out a software processing function to perform an error-correction decoding process on the macrodata unit.

The error-correction decoding process is carried out in order to correct correctable errors. After correctable errors have been corrected, the pre-found adjusted data is stored in a cache memory 61b employed in the signal processing section 61. If the acquired pre-found adjusted data contains an error that cannot be corrected, the signal processing section 61 typically makes another attempt to acquire the pre-found adjusted data from the nonvolatile memory 51 as a retrial.

It is to be noted that, as will be described later, while the power supply is in a state of being turned on, the signal processing section 61 carries out an adjustment process for each of the adjustment sections by making use of the pre-found adjusted data stored in the cache memory 61b.

As described above, in this embodiment, the pre-found adjusted data stored in the nonvolatile memory 51 includes additional error-correction codes. Thus, even if an error is generated in an operation to acquire the pre-found adjusted data stored in the nonvolatile memory 51, the error is corrected provided that the error is a correctable error. Thus, the reliability of the pre-found adjusted data is improved.

In addition, in this embodiment, as described above, it is not necessary to carry out an error-correction decoding process in the front-end circuit IC 1 which employs the nonvolatile memory 51. This is because the signal processing section 61 embedded in the demodulation circuit IC 2 is capable of carrying out the error-correction decoding process from the beginning. Thus, from the configuration point of view, this embodiment offers a merit that it is not necessary to provide a signal processing section 61 in the front-end circuit IC 1 which hardly allows such a signal processing section 61 to be embedded therein.

As described above by referring to the diagram of FIG. 4, in processing carried out once by making use of the tester 200, necessary pre-found adjusted data is generated and subjected to the error-correction encoding process, and the result is stored in the nonvolatile memory 51. However, the number of times the operation is executed to generate the pre-found adjusted data and store the adjusted data in the nonvolatile memory 51 is by no means limited to 1. For example, there is a case in which pre-found adjusted data needs to be added after the processing described above by referring to the diagram of FIG. 4 has been carried out once. The following description further explains a process to generate new adjusted data and add the new pre-found adjusted data to the pre-found adjusted data already stored in the nonvolatile memory 51 for a case in which new additional adjusted data is required.

First Typical Processing to Add Adjusted Data and ECCs

FIGS. 7A to 7C are a diagram referred to in description of a first typical process to obtain new pre-found adjusted data to be newly stored in the nonvolatile memory 51 as well as a first typical process to generate error-correction codes and associate the codes with the adjusted data in order to create pre-found adjusted data including the codes before storing the adjusted data as well as the codes in the nonvolatile memory 51. As described earlier, FIG. 6 is a diagram showing the format of the structure of the pre-found adjusted data including the error-correction codes as a format including a plurality of page units which are referred to as a macrodata unit. For the sake of convenience, however, the macrodata unit is considered to include an information-data portion to be stored in an information-data storage area of the nonvolatile memory 51 as shown on the left-hand side of the diagram of FIGS. 7A to 7C and a parity portion to be stored in a parity storage area of the nonvolatile memory 51 as shown in the right-hand side of the diagram of FIGS. 7A to 7C. This scheme is also applied to second typical processing and third typical processing which will be described later.

As shown in a partial diagram of FIG. 7A, right after the process of manufacturing the TV-broadcast receiver, no data has been stored in the nonvolatile memory 51, putting the entire nonvolatile memory 51 in an empty state. In this state, processing is carried out to obtain pre-found adjusted data Seq-1 by making use of the tester 200 and store the pre-found adjusted data Seq-1 in the nonvolatile memory 51. In this case, if processing to add new pre-found adjusted data is not taken into consideration, the pre-found adjusted data Seq-1 is stored in a free space of the information-data storage area to result in a state (1) shown in a partial diagram of FIG. 7B. The state (1) shown in a partial diagram of FIG. 7B is referred to as adjust/write Seq-1. Then, error-correction codes are generated for an information-data portion including the pre-found adjusted data Seq-1 already stored in the information-data storage area. The generated error-correction codes are referred to as error-correction code data ECC/Seq-1. The error-correction code data ECC/Seq-1 is stored in the parity storage area to result in a state (2) shown in the partial diagram of FIG. 7B. The state (2) shown in a partial diagram of FIG. 7B is referred to as ECC compute/write/end.

If pre-found adjusted data Seq-2 to be added is known in advance to exist as pre-found adjusted data following the first pre-found adjusted data Seq-1, however, it is impossible to adopt the method shown in the partial diagram of FIG. 7B to serve as a method for storing the pre-found adjusted data Seq-1 and the error-correction code data ECC/Seq-1 in the nonvolatile memory 51. This is because, once the error-correction code data ECC/Seq-1 has been stored in the parity storage area of the nonvolatile memory 51, it is impossible to store new error-correction code data ECC/Seq-2 generated from the new pre-found adjusted data Seq-2 stored in the information-data storage area as adjusted data added to the pre-found adjusted data Seq-1 as adjusted data following the pre-found adjusted data Seq-1.

In order to solve the problem described above, in the first typical processing to add pre-found adjusted data, if pre-found adjusted data Seq-2 to be added is known in advance to exist as pre-found adjusted data following the first pre-found adjusted data Seq-1, processing shown in a partial diagram of FIG. 7C is carried out. In the processing shown in the partial diagram of FIG. 7C, the first pre-found adjusted data Seq-1 is stored in a free space of the information-data storage area to result in a state (1) shown in the partial diagram of FIG. 7C. The state (1) shown in a partial diagram of FIG. 7C is referred to as adjust/write Seq-1. In the processing shown in the partial diagram of FIG. 7C, however, pre-found adjusted data including error-correction codes is not generated afterwards. Instead, the new pre-found adjusted data Seq-2 is stored in a free space of the information-data storage area to result in a state (2) shown in a partial diagram of FIG. 7C. The state (2) shown in a partial diagram of FIG. 7C is referred to as adjust/write Seq-2. Then, error-correction codes are generated for an information-data portion including the first pre-found adjusted data Seq-1 and the new pre-found adjusted data Seq-2 which have been stored in the information-data storage area. The generated error-correction codes are referred to as error-correction code data ECC/Seq-1, 2. The error-correction code data ECC/Seq-1,2 is stored in the parity storage area to result in a state (3) shown in the partial diagram of FIG. 7C.

The state (3) shown in a partial diagram of FIG. 7C is referred to as ECC compute/write/end.

Second Typical Processing to Add Adjusted Data and ECCs

FIG. 8 is a diagram referred to in description of a second typical process to obtain new pre-found adjusted data to be newly stored in the nonvolatile memory 51 as well as a second typical process to generate error-correction codes and associate the codes with the adjusted data in order to create pre-found adjusted data including the codes before storing the adjusted data as well as the codes in the nonvolatile memory 51. The second processing is typical processing in which, even if error-correction code data has been stored in the nonvolatile memory 51, it is possible to store new error-correction code data generated for a new information-data portion including existing pre-found adjusted data stored in the information-data storage area and pre-found adjusted data added to the existing adjusted data as new adjusted data following the existing adjusted data. As an alternative, it is possible to store new error-correction code data generated for the new information-data portion and for error-correction code data existing in a parity storage area by adding the new error-correction code data to existing error-correction code data.

In the second typical processing, as shown in the diagram of FIGS. 8A and 8B, the parity storage areas are provided in the nonvolatile memory 51 for pre-found adjusted data which is added after the operation to store the first error-correction code data ECC 1st besides the parity storage area for the first error-correction code data ECC 1st. The second typical processing shown in the diagram of FIG. 8 is carried out for a case in which, after the operation to store the first error-correction code data ECC 1st, pre-found adjusted data is added once. Thus, two parity storage areas are provided in order to allow the first error-correction code data ECC 1st and the second error-correction code data ECC 2nd to be stored in the two parity storage areas respectively.

A partial diagram of FIG. 8A shows a sequence of operations carried out to store the first error-correction code data ECC 1st. This sequence of operations is approximately the same as the operation sequence shown in the partial diagram of FIG. 7C. That is to say, the first error-correction code data ECC 1st shown in the partial diagram of FIG. 8A is the same as the error-correction code data ECC/Seq 1, 2 shown in the partial diagram of FIG. 7C. In the case of the sequence of operations carried out to store the first error-correction code data ECC 1st as shown in the partial diagram of FIG. 8A, however, the first error-correction code data ECC 1st is stored in the first parity storage area. The error-correction code data ECC 1st corresponds to the error-correction code data ECC/Seq-1,2 shown in the partial diagram of FIG. 7C.

On the other hand, a partial diagram of FIG. 8B shows a sequence of operations carried out to store the second error-correction code data ECC 2nd generated after the sequence of operations carried out to store the first error-correction code data ECC 1st. First of all, in the sequence of operations carried out to store the second error-correction code data ECC 2nd in accordance with this embodiment as shown in the partial diagram of FIG. 8B, pre-found adjusted data Seq-3 is stored in a free space of the information-data storage area to result in a state (1) shown in the partial diagram of FIG. 8B. The state (1) shown in a partial diagram of FIG. 8B is referred to as adjust/write Seq-3.

Then, error-correction codes are generated for an information-data portion including the pre-found adjusted data Seq-1, the pre-found adjusted data Seq-2 and the second pre-found adjusted data Seq-3 which have been stored in the information-data storage area. The generated error-correction codes are referred to as error-correction code data ECC 2nd. The error-correction code data ECC 2nd can also be referred to as the error-correction code data ECC/Seq-1,2,3. The error-correction code data ECC 2nd is stored in the second parity storage area to result in a state (2-1) shown in the partial diagram of FIG. 8B. The state (2-1) shown in a partial diagram of FIG. 8B is referred to as ECC compute/write.

In addition, in place of the process to result in the state (2-1), error-correction codes are generated for the information-data portion including the pre-found adjusted data Seq-1, the pre-found adjusted data Seq-2 and the second pre-found adjusted data Seq-3 which have been stored in the information-data storage area as well as a parity portion including the first error correction code data ECC 1st already stored in the first parity storage area. The generated error-correction codes are referred to as error-correction code data ECC 2nd. The error-correction code data ECC 2nd is stored in the second parity storage area to result in a state (2-2) shown in the partial diagram of FIG. 8B. The state (2-2) shown in a partial diagram of FIG. 8B is referred to as ECC compute/write.

In the second typical processing, the parity section is configured to have a storage capacity enough for the error-correction code data to be stored for the number of times of adding the adjusting data. Thus, even if additional error-correction code data is generated for new pre-found adjusted data every time an adjustment process is carried out, the new pre-found adjusted data and the additional error-correction code data can be newly stored in the nonvolatile memory 51.

Third Typical Processing to Add Adjusted Data and ECCs

FIGS. 9A and 9B are a plurality of diagrams referred to in description of a third typical process to obtain new pre-found adjusted data to be newly stored in the nonvolatile memory 51 as well as a third typical process to generate error-correction codes and associate the codes with the adjusted data in order to create pre-found adjusted data including the codes before storing the adjusted data as well as the codes in the nonvolatile memory 51. The third processing is typical processing in which, even if error-correction code data has been stored in the nonvolatile memory 51, it is possible to store new error-correction code data generated for a new information-data portion including existing pre-found adjusted data stored in the information-data storage area and pre-found adjusted data added to the existing adjusted data as new adjusted data following the existing adjusted data.

In accordance with the third typical processing to add pre-found adjusted data and ECCs, which are also referred to hereafter as error-correction code data, the memory area of the nonvolatile memory 51 is divided into n memory blocks B1, B2, . . . and Bn each provided with a storage capacity for storing a macroblock. In addition, in the third typical processing to add pre-found adjusted data and ECCs, each time processing is carried out to obtain pre-found adjusted data and store in the nonvolatile memory 51, error-correction code data for the pre-found adjusted data is generated and stored in the nonvolatile memory 51.

In the third typical processing to add adjusted data and ECCs, however, pre-found adjusted data obtained in a process and error-correction code data generated for the pre-found adjusted data in the same process are stored in a memory block different from the memory block used for storing pre-found adjusted data obtained in another process and error-correction code data generated for the pre-found adjusted data in the other process. In addition, in the third typical processing to add adjusted data and ECCs, the signal processing section 61 acquires pre-found adjusted data and utilizes the adjusted data which has been stored in a macroblock used in the last process to obtain pre-found adjusted data and store in the nonvolatile memory 51 as well as generate error-correction code data for the pre-found adjusted data and store the error-correction code data in the nonvolatile memory 51.

That is to say, as shown in the diagram of FIG. 9A, in the first adjustment process, pre-found adjusted data Seq-1 is stored in the information-data storage area of a memory block B1 whereas error-correction code data ECC 1st generated for an information-data portion including the pre-found adjusted data Seq-1 stored in the data-portion area is stored in the parity storage area of the same memory block B1.

In an operation to store second pre-found adjusted data Seq-2 in the nonvolatile memory 51, the first pre-found adjusted data Seq-1 is copied from the memory block B1 to the memory block B2 as shown in the diagram of FIG. 9B. Then, the second pre-found adjusted data Seq-2 is added to a free information-data storage area in the memory block B2. Subsequently, second error-correction code data ECC 2nd is generated for an information-data portion including the second pre-found adjusted data Seq-2 and the first pre-found adjusted data Seq-1, which have been stored in the memory block B2, and is stored in the parity storage area of the memory block B2.

It is to be noted that, also in the case of the third typical processing, the second error-correction code data ECC 2nd can also be generated for not only the information-data portion including the second pre-found adjusted data Seq-2 and the first pre-found adjusted data Seq-1, but also the parity portion including the error-correction code data ECC 1st in the same way as the process explained earlier by referring the state (2-2) in the second typical processing described above by referring to the diagram of FIG. 8B.

In accordance with the third typical processing, even if additional error-correction code data is generated for new pre-found adjusted data every time an adjustment process is carried out, the new adjusted data and the additional error-correction code data can be newly stored in the nonvolatile memory 51.

Pre-Shipping and Post-Shipping Adjusted Data

The above description explains pre-shipping adjusted data which is pre-found adjusted data stored in the nonvolatile memory 51 before the TV-broadcast receiver is shipped from a factory which manufactures the TV-broadcast receiver. Even after the TV-broadcast receiver has been shipped from the factory, however, in an environment where the user utilizes the TV-broadcast receiver, an operator or the like may want to acquire new pre-found adjusted data for an adjustment item of a certain type and add the new adjusted data to pre-found adjusted data already existing in the nonvolatile memory 51 in some cases. In the following description, the new pre-found adjusted data is referred to as post-shipping adjusted data.

In this embodiment, post-shipping adjusted data is also taken into consideration. That is to say, in this embodiment, the nonvolatile memory 51 is configured to include a plurality of banks. In the case of this embodiment, the nonvolatile memory 51 has four banks which are referred to as BANK0, BANK1, BANK2 and BANK3 respectively as shown in a diagram of FIG. 10.

Figure 10:
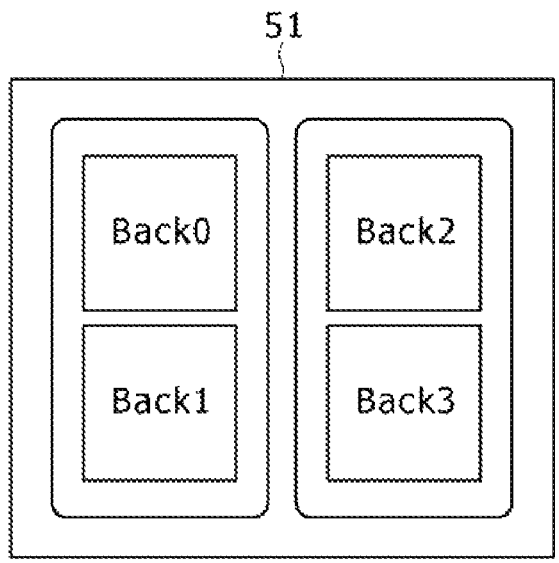
FIG. 10 is a diagram to be referred to in description of a method for managing stored data in the nonvolatile memory employed in an electronic apparatus according to the embodiment.

Each of banks BANK0 and BANK2 is used as a storage area for storing pre-shipping pre-found adjusted data. On the other hand, each of banks BANK1 and BANK3 is used as a storage area for storing post-shipping pre-found adjusted data. In addition, banks BANK0 and BANK1 are used as a pair of banks as shown in the diagram of FIG. 10. By the same token, banks BANK2 and BANK3 are also used as a pair of banks.

Normally, BANK0 is used as a storage area for storing pre-shipping pre-found adjusted data before BANK 2 is used.

By the same token, BANK1 is normally used as a storage area for storing post-shipping pre-found adjusted data before BANK3 is used. Now, let attention be paid to the pair of banks BANK0 and BANK1. With bank BANK1 already used as a storage area for storing post-shipping pre-found adjusted data, bank BANK0 has also already been used as a storage area for storing pre-shipping pre-found adjusted data. Thus, when pre-found adjusted data is read out from banks BANK0 and BANK1 forming a pair, no problem is raised.

Now, let attention be paid to the pair of banks BANK2 and BANK3. There may be a case in which bank BANK3 has already been used as a storage area for storing post-shipping pre-found adjusted data even though bank BANK2 has not been used as a storage area for storing pre-shipping pre-found adjusted data. Thus, when pre-found adjusted data is read out from banks BANK2 and BANK3 forming a pair, a problem is raised. In order to solve this problem, the nonvolatile memory 51 is so configured that, when bank BANK3 is used as a storage area for storing post-shipping pre-found adjusted data even though bank BANK2 has not been used as a storage area for storing pre-shipping pre-found adjusted data, pre-shipping pre-found adjusted data stored in bank BANK0 is copied to bank BANK2. In addition, bank BANK2 is provided with a write flag FB_2. When pre-shipping pre-found adjusted data is stored in bank BANK2, the write flag FB_2 is reset at 0 indicating a state in which pre-shipping pre-found adjusted data has been already stored in bank BANK2.

On top of that, the nonvolatile memory 51 and the signal processing section 61 in this embodiment are so configured that, when the signal processing section 61 acquires pre-found adjusted data from banks BANK2 and BANK3 with post-shipping pre-found adjusted data already stored in bank BANK3, the signal processing section 61 refers to the write flag FB_2 in order to verify that pre-shipping pre-found adjusted data has been stored in bank BANK2.

Figure 11:
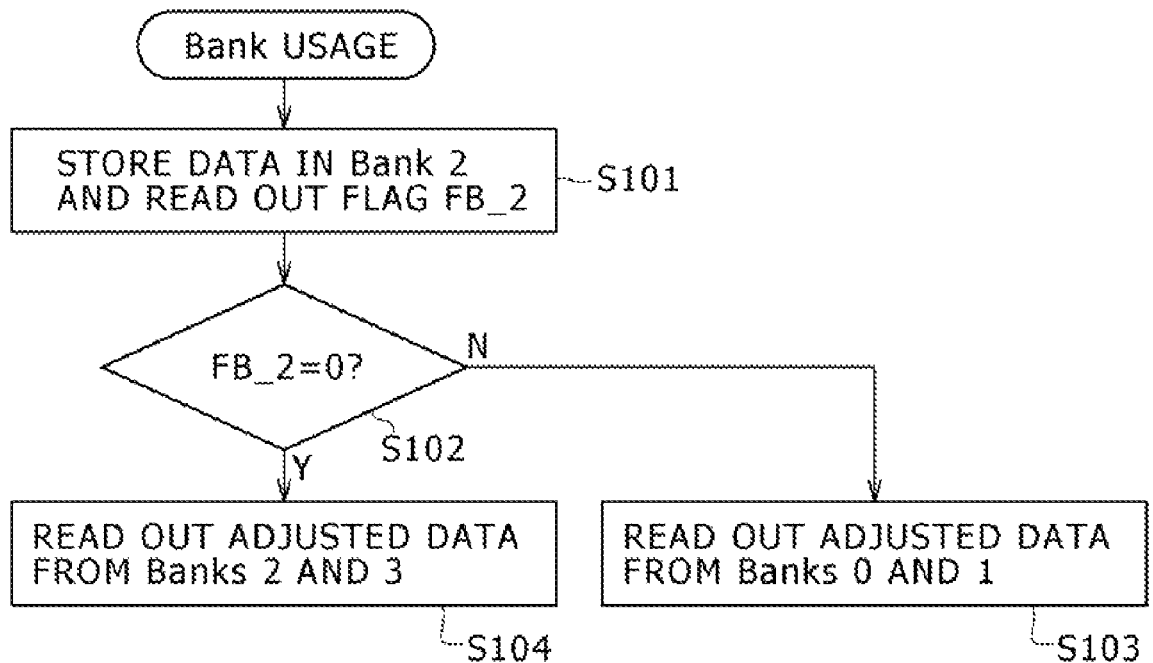
FIG. 11 shows a flowchart representing a method for managing stored data in the nonvolatile memory employed in an electronic apparatus according to the embodiment.

In detail, the signal processing section 61 acquires pre-found adjusted data from the nonvolatile memory 51 by execution of a processing routine for determining a pair of banks as represented by a flowchart shown in FIG. 11 as follows:

As shown in the figure, the flowchart begins with a step S101 at which the signal processing section 61 acquires the write flag FB_2 associated with bank BANK2 before obtaining pre-found adjusted data from the nonvolatile memory 51. Then, at the next step S102, the signal processing section 61 produces a result of determination as to whether the write flag F_B2 has been set at 0.

If the determination result produced in the process carried out at the step S102 indicates that the write flag FB_2 has not been set at 0, the flow of the processing routine goes on to a step S103 at which the signal processing section 61 acquires pre-found adjusted data from the pair of banks BANK0 and BANK1.

If the determination result produced in the process carried out at the step S102 indicates that the write flag F_B2 has been set at 0, on the other the hand, the flow of the processing routine goes on to a step S104 at which the signal processing section 61 acquires pre-found adjusted data from the pair of banks BANK2 and BANK3.

As described above, different storage areas of the nonvolatile memory 51 are used for storing pre-shipping pre-found adjusted data and post-shipping pre-found adjusted data so that both the pre-shipping pre-found adjusted data and the post-shipping pre-found adjusted data can be stored in the nonvolatile memory 51 without raising a problem. It is to be noted that each of the pre-shipping pre-found adjusted data and the post-shipping pre-found adjusted data is stored in the nonvolatile memory 51 in a format including error-correction codes as described before.

Adjustment Operations Using Pre-Found Adjusted Data From Power-Supply on to Power-Supply Off In a TV-broadcast receiver according to this embodiment, an adjustment operation making use of pre-found adjusted data stored in the nonvolatile memory 51 is carried out every time the user changes the selected reception channel assigned to a TV broadcasting station desired by the user.

In this case, however, the signal processing section 61 makes an access to the nonvolatile memory 51 every time the user changes the selected reception channel assigned to a TV broadcasting station desired by the user. The high frequency at which the signal processing section 61 makes an access to the nonvolatile memory 51 is not desirable if one considers that, at such a high frequency, the magnitude of the consumed current is large and the life of the nonvolatile memory 51 is short.

In order to solve the problem described above, the embodiment is configured to make an access to the nonvolatile memory 51 only once in order to acquire pre-found adjusted data from the nonvolatile memory 51 only when the power supply is turned on.

Figure 12:
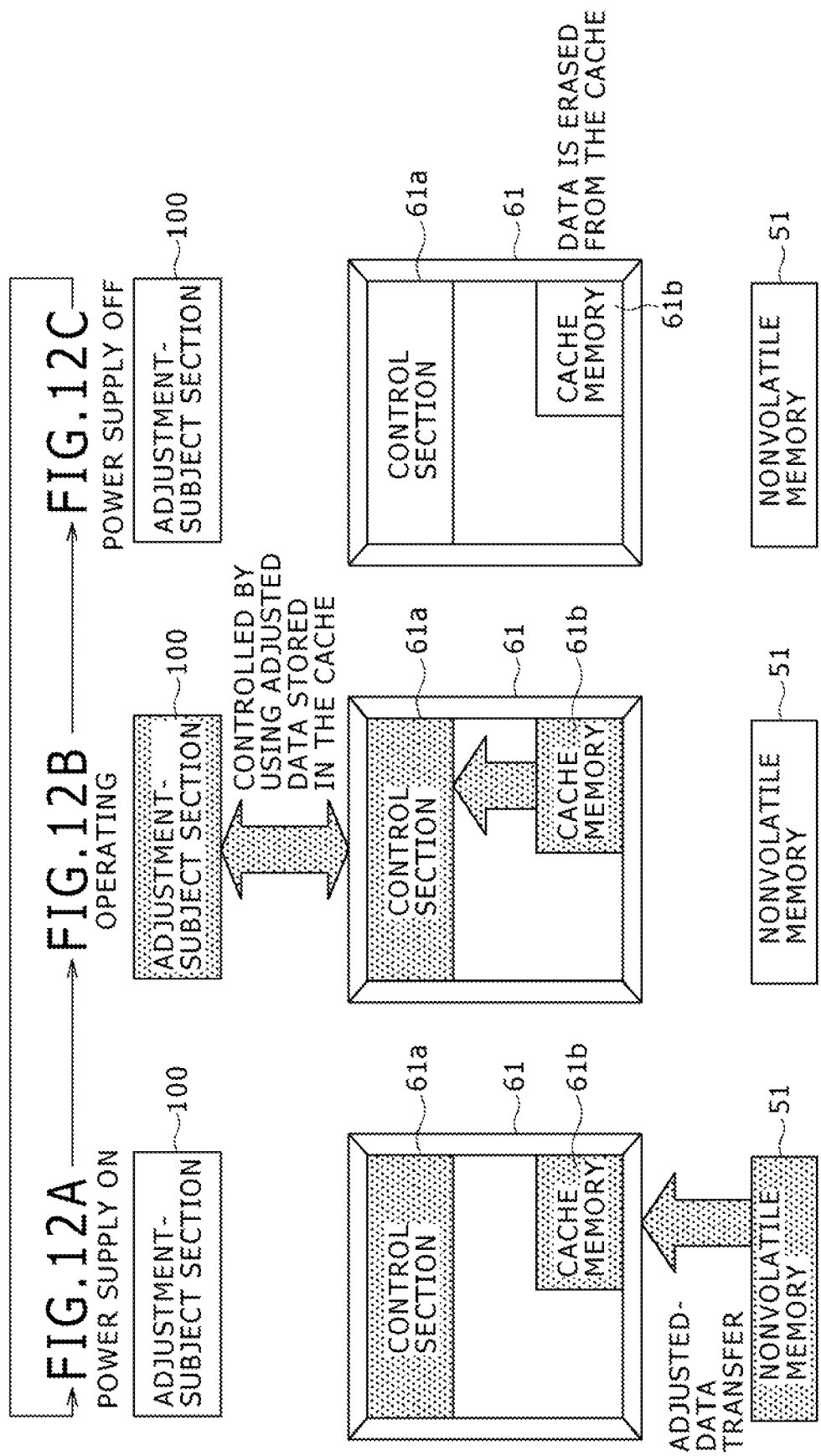
FIGS. 12A to 12C are conceptual diagrams to be referred to in explanation of a process starting from when the power supply is turned on until it is turned off in an electronic apparatus according to the embodiment.

FIGS. 12A to 12C are a plurality of conceptual diagrams referred to in explanation of a configuration. Each shaded block in the diagrams of FIGS. 12A to 12C represents an element included in the configuration as an element involved in a transfer of pre-found adjusted data. FIG. 12A is the diagram referred to in explanation of the configuration in which, at a power-on time, the signal processing section 61 makes a request to acquire pre-found adjusted data from the nonvolatile memory 51 and, in response to the request, the nonvolatile memory 51 transfers the pre-found adjusted data to the signal processing section 61. In the signal processing section 61, the pre-found adjusted data received from the nonvolatile memory 51 is stored in a cache memory 61b embedded in the signal processing section 61.

FIG. 12B is the diagram referred to in explanation of the configuration in which, in an operating state with the power supply of the TV-broadcast receiver put in a turned-on state, a control section 61a employed in the signal processing section 61 generates to-be-actually-used adjusted data on the basis of the pre-found adjusted data stored in advance in the cache memory 61b and, then, supplies the to-be-actually-used adjusted data generated thereby to every adjustment-subject section 100 employed in the front-end circuit section 10. In the process of generating to-be-actually-used adjusted data on the basis of the pre-found adjusted data stored in the cache memory 61b, the control section 61a employed in the signal processing section 61 may create the to-be-actually-used adjusted data by carrying out an interpolation process based on the pre-found adjusted data stored in the cache memory 61b.

FIG. 12C is the diagram referred to in explanation of the configuration in which, when the power supply employed in the TV-broadcast receiver is turned off, the pre-found adjusted data stored in the cache memory 61b employed in the signal processing section 61 is lost. When the power supply employed in the TV-broadcast receiver is turned on again, on the other hand, the state of the configuration is restored to the state shown in the diagram of FIG. 12A.

Figure 13:
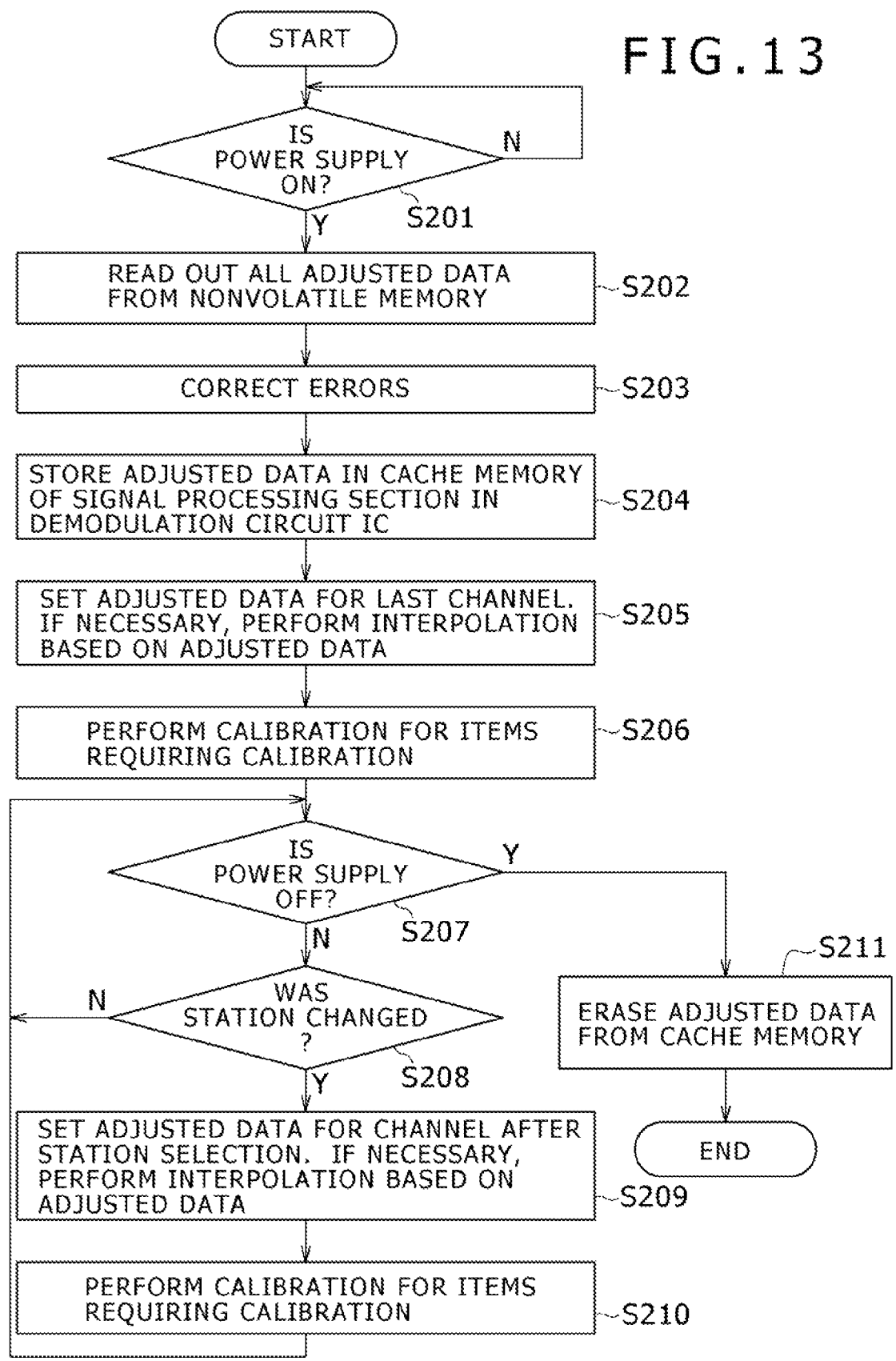
FIG. 13 shows a flowchart representing the flow of process starting from when the power supply is turned on until it is turned off in an electronic apparatus according to the embodiment.

FIG. 13 shows a flowchart representing the flow of processing including operations carried out consecutively by the signal processing section 61 since a time at which the power supply employed in the TV-broadcast receiver is turned on till a time at which the power supply employed in the TV-broadcast receiver is turned off.

As shown in FIG. 13, the flowchart begins with a step S201 at which the signal processing section 61 is in a state of continuously monitoring a command issued by the system controller 4 when the power supply employed in the TV-broadcast receiver is turned on by the user. If the determination result produced in the process carried out at the step S201 indicates that the monitored command is a command issued by the system controller 4 when the power supply employed in the TV-broadcast receiver is turned on, the flow of the processing goes on to a step S202 at which the signal processing section 61 requests the I/F section 52 in the front-end circuit IC 1 to read out pre-found adjusted data from the nonvolatile memory 51.

At the step S202, the signal processing section 61 receives pre-found adjusted data read out from the nonvolatile memory 51 and supplied to the signal processing section 61 by way of the I/F section 52. Then, at the next step S203, the signal processing section 61 carries out an error-correction decoding process on the pre-found adjusted data. Subsequently, at the next step S204, stores pre-found adjusted data with errors thereof corrected in the error-correction decoding process into a cache memory 61b embedded in the signal processing section 61.

Then, at the next step S205, typically, the signal processing section 61 receives information on an eventually selected channel (that is, the reception channel assigned to an eventually desired TV broadcasting station) by way of the system controller 4 for example. Subsequently, the signal processing section 61 supplies information to be used for selecting a TV broadcasting station corresponding to the eventually selected channel to the front-end circuit IC 1. The information to be used for selecting a TV broadcasting station includes the frequency-division ratios to be supplied to the variable-frequency circuits 32 and 36 employed in the PLL 30 and to-be-actually-used adjusted data for each adjustment section employed in the front-end circuit section 10 described earlier. The control section 61a finds the to-be-actually-used adjusted data for the eventually selected channel on the basis of the pre-found adjusted data stored in the cache memory 61b. In the process of generating to-be-actually-used adjusted data, the control section 61a may create the to-be-actually-used adjusted data by carrying out an interpolation process such as linear interpolation based on the pre-found adjusted data if necessary.

Then, at the next step S206, the signal processing section 61 carries out a calibration process for each adjustment item which requires that the process be performed. In the execution of the calibration process, the signal processing section 61 puts the test-signal generation section 7 in an operating state of generating a test signal as described before and drives the switch circuit 6 to enter a state of selecting the test signal generated by the test-signal generation section 7. As the execution of the calibration process is ended, the signal processing section 61 puts the test-signal generation section 7 in an inoperative state of ending the generation of the test signal and drives the switch circuit 6 to enter a state of selecting a reception signal supplied by the TV-broadcast signal receiving antenna 5. Thus, the TV-broadcast receiver is put in a state of receiving a reception signal of the reception channel assigned to the eventually desired TV broadcasting station.

Then, at the next step S207, the signal processing section 61 enters a state of detecting a command received from the system controller 4 in order to produce a result of determination as to whether or not the detected command is a command issued by the system controller 4 when the power supply employed in the TV-broadcast receiver is turned off by the user. If the determination result produced in the process carried out at the step S207 indicates that no command has been issued by the system controller 4 to notify that the power supply employed in the TV-broadcast receiver has been turned off, the flow of the processing goes on to a step S208.

At the step S208, the signal processing section 61 produces a result of determination as to whether or not the user has changed the selected channel assigned to a TV broadcasting station. If the determination result produced in the process carried out at the step S207 indicates that the user has not changed the selected channel assigned to a TV broadcasting station, the flow of the processing goes back to the step S207 in order to repeat the processes carried out at the step S207 and subsequent steps.

If the determination result produced in the process carried out at the step S208 indicates that the user has changed the selected channel assigned to a TV broadcasting station, on the other hand, the flow of the processing goes on to a step S209. At the step S209, the signal processing section 61 receives information on the newly selected channel (that is, the reception channel assigned to the newly desired TV broadcasting station) by way of the system controller 4. Subsequently, the signal processing section 61 supplies information to be used for selecting a TV broadcasting station corresponding to the newly selected channel to the front-end circuit IC 1. The information to be used for selecting a TV broadcasting station includes the frequency-division ratios to be supplied to the variable-frequency circuits 32 and 36 employed in the PLL 30 and to-be-actually-used adjusted data for each adjustment section employed in the front-end circuit section 10 described earlier. The control section 61a finds the to-be-actually-used adjusted data for the newly selected channel on the basis of the pre-found adjusted data stored in the cache memory 61b. In the process of generating to-be-actually-used adjusted data, the control section 61a may create the to-be-actually-used adjusted data by carrying out an interpolation process such as linear interpolation based on the pre-found adjusted data if necessary.

Then, at the next step S210, the signal processing section 61 carries out a calibration process for each adjustment item which requires that the process be performed. In the execution of the calibration process, the signal processing section 61 puts the test-signal generation section 7 in an operating state of generating a test signal as described before and drives the switch circuit 6 to enter a state of selecting the test signal generated by the test-signal generation section 7.

As the execution of the calibration process is ended, the signal processing section 61 puts the test-signal generation section 7 in an inoperative state of ending the generation of the test signal and drives the switch circuit 6 to enter a state of selecting a reception signal supplied by the TV-broadcast signal receiving antenna 5. Thus, the TV-broadcast receiver is put in a state of receiving a reception signal of the reception channel assigned to the eventually desired TV broadcasting station.

Then, the flow of the processing goes back to the step S207 in order to repeat the processes carried out at the step S207 and subsequent steps.

If the determination result produced in the process carried out at the step S207 indicates that a command has been issued by the system controller 4 to notify that the power supply employed in the TV-broadcast receiver has been turned off, on the other hand, the flow of the processing goes on to a step S211 at which the pre-found adjusted data stored in the cache memory 61b is erased. Then, the signal processing section 61 ends the processing represented by the flowchart shown in FIG. 13. It is to be noted that the process of the step S211 is not a process carried out by the signal processing section 61. Instead, the process of the step S211 is described here in order to verify that all data stored in the cache memory 61*b* is lost when the power supply of the TV-broadcast receiver is turned off.

Typical Interpolation Performed by the Signal Processing Section 61

By making use of the IF-BPF cutoff-frequency adjusted data included in the data structure shown in the diagram of FIG. 3 as pre-found adjusted data stored in the cache memory 61*b*, the intermediate-frequency bandwidths of the complex band pass filter 24 can be made capable of coping with all the broadcasting systems. Then, by carrying out an interpolation process based on the IF-BPF cutoff-frequency adjusted data included in the data structure shown in the diagram of FIG. 3 in accordance with the desired intermediate-frequency bandwidths, the cutoff frequencies can be finely adjusted.

Figure 14:
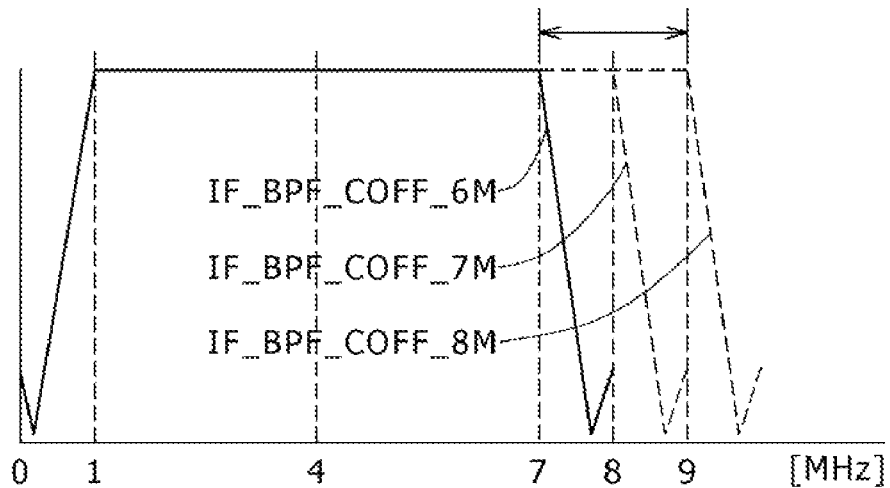
FIG. 14 is an explanatory diagram to be referred to in description of pre-found adjusted data in an electronic apparatus according to the embodiment.

FIG. 14 is an explanatory diagram referred to in description of the IF-BPF cutoff-frequency adjusted data to be stored in the nonvolatile memory 51. As shown in FIG. 14, the same minimum cutoff frequency is used for all intermediate-frequency bandwidths of the complex band pass filter 24. Thus, it is not necessary to store the same minimum frequency in the nonvolatile memory 51 as pre-found adjusted data.

The pre-found adjusted data listed below is the IF-BPF cutoff-frequency adjusted data as pre-found adjusted data used for setting the cutoff frequencies of the complex band pass filter 24 for bandwidths of 6 MHz, 7 MHz and 8 MHz set for the three reception bands:

IF_BPF_COFF__6M,
IF_BPF_COFF__7M and
IF_BPF_COFF__8M.

Figure 15:
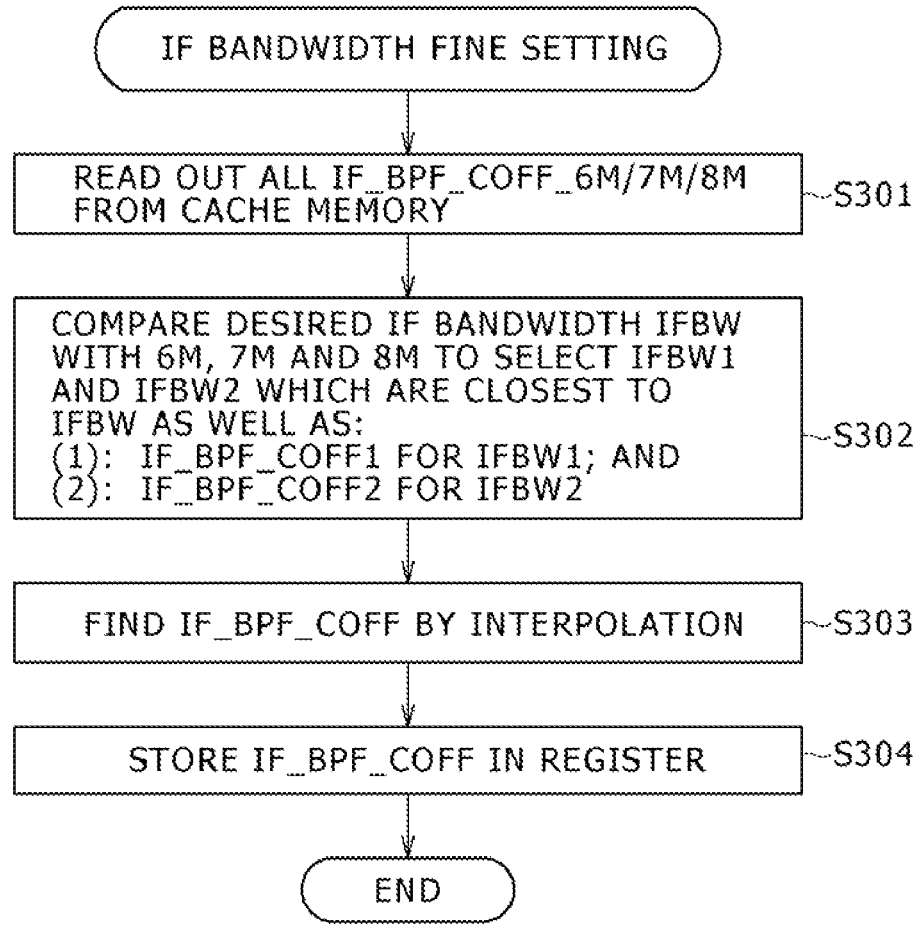
FIG. 15 shows a flowchart representing a process for generating to-be-actually-used adjusted data on the basis of the pre-found adjusted data in an electronic apparatus according to the embodiment.

The signal processing section 61 carries out interpolation processing based on the IF-BPF cutoff-frequency adjusted data listed above in order to find a cutoff frequency, that is optimum for the selected reception channel assigned to a TV broadcasting station desired by the user, for the complex band pass filter 24 provided for intermediate frequencies. FIG. 15 shows a flowchart representing the interpolation processing carried out by the signal processing section 61.

As shown in the figure, the flowchart begins with a step S301 at which the control section 61 a employed in the signal processing section 61 reads out the pre-found adjusted data IF_BPF_COFF__6M, IF_BPF_COFF__7M and IF_BPF_COFF__8M from the cache memory 61*b*.

Then, at the next step S302, the signal processing section 61 compares a desired intermediate-frequency bandwidth IFBW proper for the selected reception channel assigned to a desired TV broadcasting station with the three reception bands, i.e., the reception bands of 6 MHz, 7 MHz and 8 MHz in order to determine two reception bandwidths closest to the desired intermediate-frequency bandwidth IFBW.

In detail, first of all, a first intermediate-frequency bandwidth IFBW1 closest to the desired intermediate-frequency bandwidth IFBW is selected from the three reception bands, i.e., the reception bands of 6 MHz, 7 MHz and 8 MHz. Let reference notation IF_BPF_COFF1 denote a cutoff-frequency adjusted data stored as the pre-found adjusted data corresponding to the reception band of 6 MHz, 7 MHz or 8 MHz which has been selected as the first intermediate-frequency bandwidth IFBW1.

Then, a second intermediate-frequency bandwidth IFBW2 all but closest to the desired intermediate-frequency bandwidth IFBW is selected from the three reception bands, i.e., the reception bands of 6 MHz, 7 MHz and 8 MHz. Let reference notation IF_BPF_COFF2 denote a cutoff-frequency adjusted data stored as the pre-found adjusted data corresponding to the reception band of 6 MHz, 7 MHz or 8 MHz which has been selected as the second intermediate-frequency bandwidth IFBW2.

Then, at the next step S303, the signal processing section 61 carries out an interpolation process according to Eq. (A) shown in FIG. 16 as an equation, in order to compute cutoff-frequency adjusted data IF_BPF_COFF which is the cutoff frequency proper for the desired intermediate-frequency bandwidth IFBW.

Then, at the next step S304, the signal processing section 61 stores the proper cutoff-frequency adjusted data IF_BPF_COFF computed in the process carried out at the step S303 in a register. The proper cutoff-frequency adjusted data IF_BPF_COFF stored in the register is used as a finely adjusted cutoff frequency of the complex band pass filter 24 provided for intermediate frequencies as long as the power supply of the TV-broadcast receiver is in state of being turned on.

It is to be noted that the interpolation processing to compute the finely adjusted cutoff frequency of the complex band pass filter 24 provided for intermediate frequencies as described above by referring to the flowchart shown in FIG. 15 is only one of typical examples of the interpolation process carried out at the step S205 or S209 of the flowchart shown in FIG. 13.

Next, the following description explains another typical example of the interpolation process carried out at the steps S205 and S209 of the flowchart shown in FIG. 13. As indicated by the curve shown in the diagram of FIG. 17, some pieces of pre-found adjusted data are each dependent on the frequency of a selected reception channel desired by the user. Every time the selected reception channel assigned to a TV broadcasting station desired by the user is changed, the to-be-actually-used adjusted data stored for the frequency of the reception channel is generated. In this case, however, pre-found adjusted data may not have been stored in the nonvolatile memory 51 for the frequency of the selected reception channel assigned to the newly desired TV broadcasting station.

Figures 16, 17:
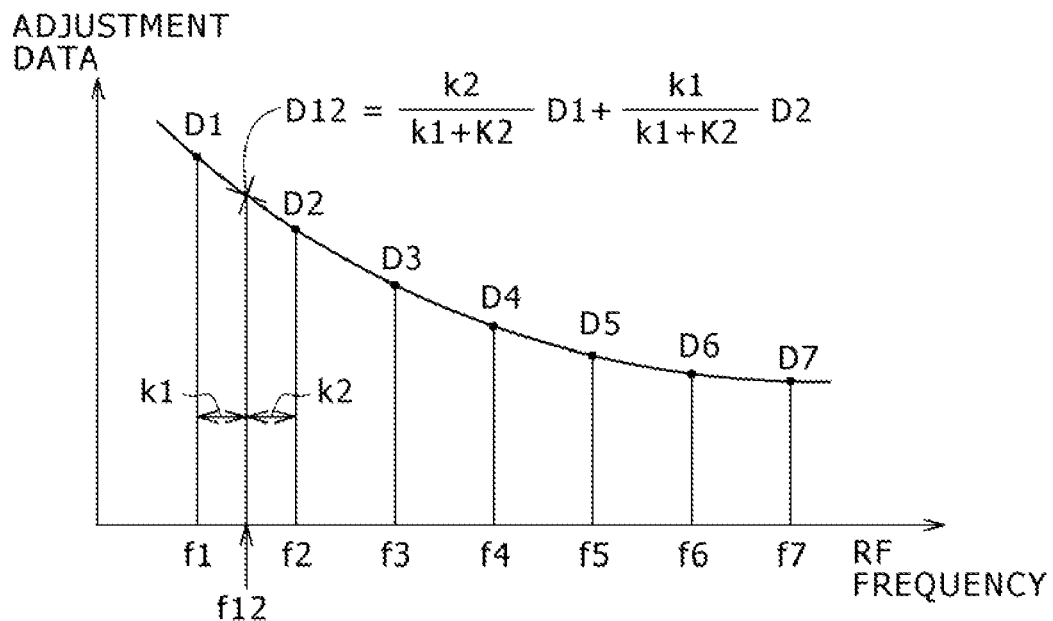
FIG. 16 shows the process represented by the flowchart shown in FIG. 15.
FIG. 17 is a diagram to be referred to in description of a processing for generating the to-be-actually-used adjusted data on the basis of the pre-found adjusted data in an electronic apparatus according to the embodiment.

Pieces of pre-found adjusted data D1, D2, D3 and so on have been stored in the nonvolatile memory 51 for reception RF frequencies f1, f2, f3 and so on respectively as indicated by the curve shown in the diagram of FIG. 17.

As described above, if no pre-found adjusted data has been stored in the nonvolatile memory 51 for the RF frequency of a newly selected reception channel assigned to the newly desired TV broadcasting station, the signal processing section 61 of this embodiment carries out an interpolation process in order to compute to-be-actually-used adjusted data for the frequency of the newly selected reception channel.

For example, the frequency f12 of the selected reception channel assigned to the newly desired TV broadcasting station for which no pre-found adjusted data has been stored in the nonvolatile memory 51 is a frequency between the RF frequencies f1 and f2 as indicated by the curve shown in the diagram of FIG. 17. In this case, the signal processing section 61 of this embodiment carries out an interpolation process by using the data D1 and D2 of the frequencies f1 and f2 positioned on both sides of the frequency f12 in order to compute to-be-actually-used adjusted data D12 for the frequency of the newly selected reception channel in accordance with Eq. (B) as follows.

$$D12=\{k2/(k1+k2)\}D1+\{k1/(k1+k2)\}D2 \quad \text{(B)}$$

In the Eq. (B) given above, reference notation k1 denotes the difference between the RF frequencies f12 and f1 whereas reference notation k2 denotes the difference between the RF frequencies f12 and f2.

Typical Calibration Processing

The following description explains a typical example of the calibration processes carried out at the steps S206 and S210 of a flowchart shown in FIG. 13. The typical calibration process described below is a process carried out to adjust an image-interference elimination characteristic in the complex band pass filter 24 which functions as an intermediate-frequency filter. A process carried out to calibrate the image-interference elimination characteristic is referred to as an IMRR calibration process.

In order to carry out the IMRR calibration process as a typical calibration process, the demodulation circuit IC 2 is provided with the detection circuit 62.

Figure 18:
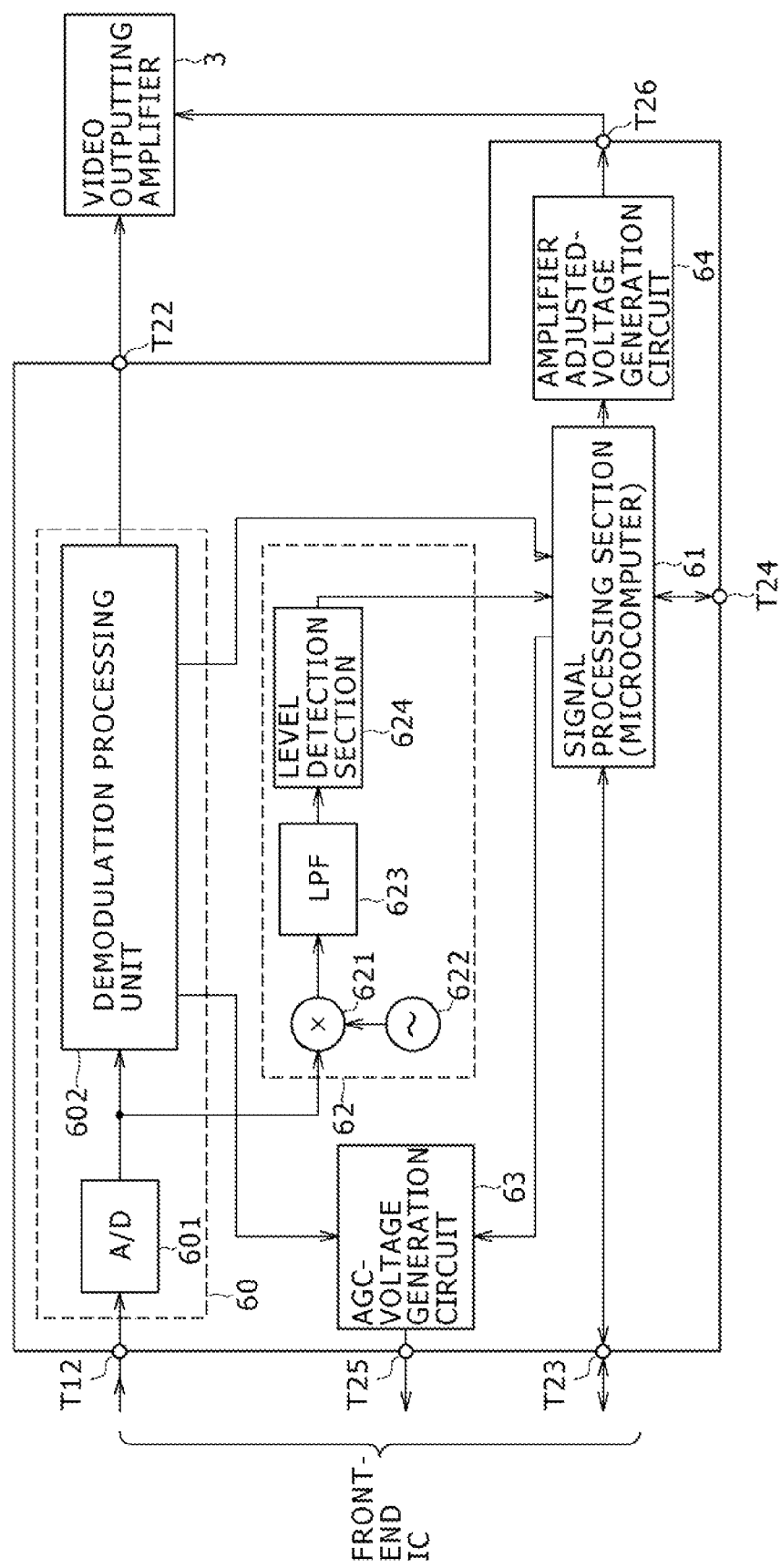
FIG. 18 is a block diagram focusing on the configuration for carrying out a calibration process in an electronic apparatus according to the embodiment.

First Typical Configuration of the Detection Circuit 62 for Carrying Out the IMRR Calibration FIG. 18 is a block diagram showing the demodulation circuit IC 2 by focusing on the configuration of the demodulation circuit section 60 and a first typical concrete configuration of the detection circuit 62 for carrying out the IMRR calibration process. As shown in the block diagram of FIG. 18, the demodulation circuit section 60 includes a demodulation processing unit 602 and an A/D converter 601 which is a section for converting an analog intermediate-frequency signal received from the front-end circuit IC 1 into a digital intermediate-frequency signal. The A/D converter 601 supplies the digital intermediate-frequency signal to the detection circuit 62.

As shown in the block diagram of FIG. 18, the first typical concrete configuration of the detection circuit 62 includes a multiplier 621, an oscillator 622, a low pass filter 623 and a level detection section 624.

In the first typical concrete configuration of the detection circuit 62, the oscillator 622 serves as a section for generating an oscillation signal having an intermediate frequency. The oscillator 622 supplies the oscillation signal having an intermediate frequency to the multiplier 621 and, at the same time, the A/D converter 601 also supplies the digital intermediate-frequency signal to the multiplier 621. The multiplier 621 generates an output signal having a frequency equal to the difference in frequency between the intermediate-frequency oscillation signal and the digital intermediate-frequency signal. The multiplier 621 supplies the output signal generated thereby to the level detection section 624 by way of the low pass filter 623. The level detection section 624 detects the level of the output signal generated by the multiplier 621 and outputs the result of detection to the signal processing section 61.

A test signal generated by the test-signal generation section 7 to be used in an IMRR calibration process is a signal having a fixed frequency. The frequency of this test signal is set by the signal processing section 61 at such a value that this test signal becomes an image interference frequency in a selected reception channel assigned to a TV broadcasting station desired by the user.

Thus, if the test signal supplied to the front-end circuit IC 1 by way of the antenna terminal pin T11 in an IMRR calibration mode is eventually processed by the complex band pass filter 24 which has been adjusted to a state of providing an optimum image-interference elimination characteristic, the level detected by the level detection section 624 employed in the detection circuit 62 is ideally zero.

In this embodiment, by referring to the level detected by the level detection section 624 employed in the detection circuit 62, the signal processing section 61 calibrates the adjusted data of the image-interference elimination characteristic in the complex band pass filter 24 provided for intermediate frequencies. To put it in detail, the signal processing section 61 calibrates the adjusted data so as to give an optimum image-interference elimination characteristic.

Typical IMRR Calibration Performed by the Signal Processing Section 61

Figure 19:
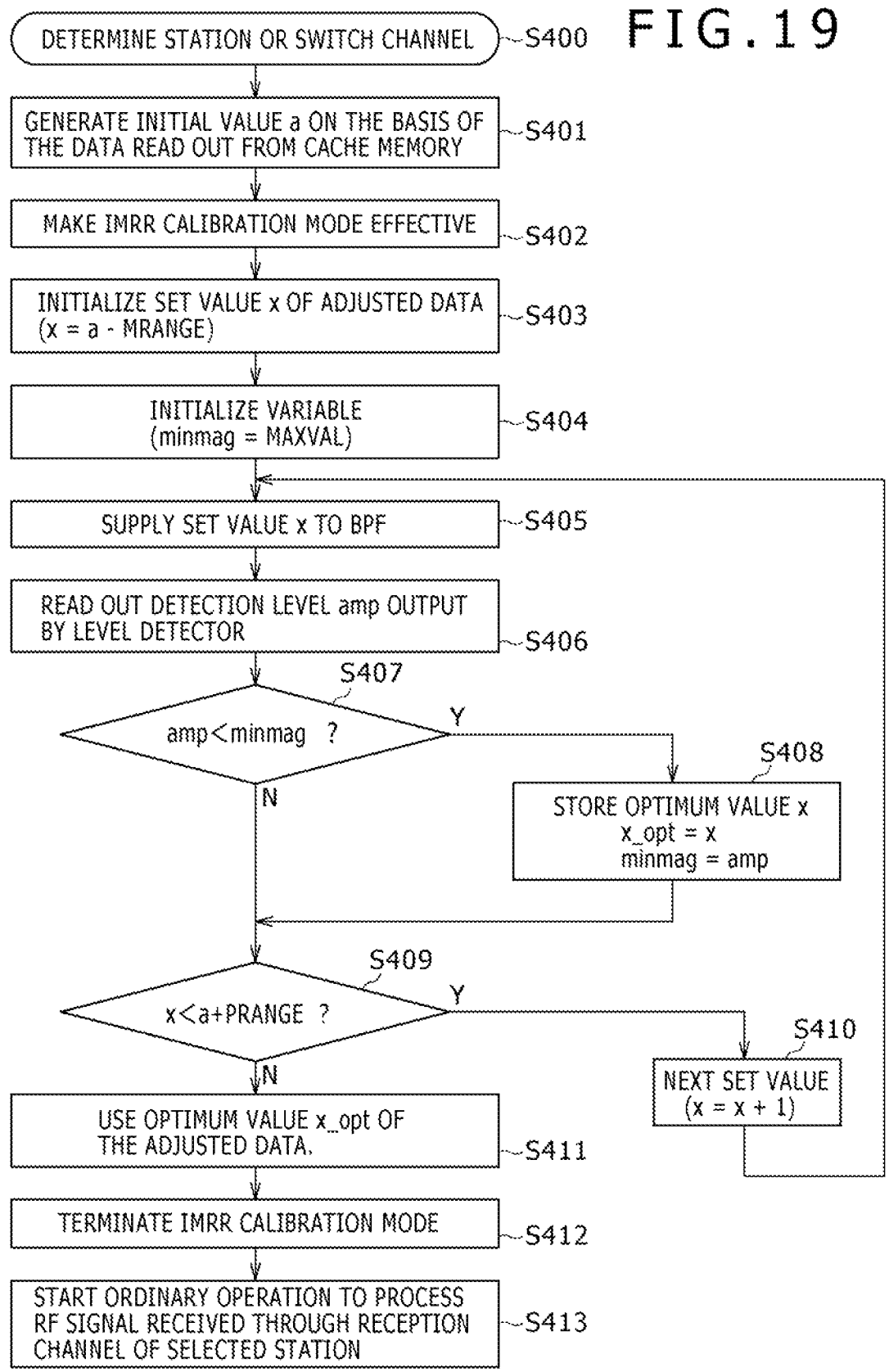
FIG. 19 shows a flowchart representing the flow of a typical calibration processing in an electronic apparatus according to the embodiment.

FIG. 19 shows a flowchart representing the flow of processing carried out by the signal processing section 61 by execution of a typical IMRR calibration processing routine.

The flowchart shown in FIG. 19 to represent the typical IMRR calibration processing routine begins with a step S400 when a selected reception channel assigned to a TV broadcasting station desired by the user is finally determined or when the selected reception channel assigned to a TV broadcasting station desired by the user is switched to another.

First of all, prior to the typical IMRR calibration processing, the control section 61a employed in the signal processing section 61 reads out pre-found adjusted data from the cache memory 61b and generates to-be-actually-used adjusted data on the basis of the pre-found adjusted data as described before. Then, the signal processing section 61 supplies the to-be-actually-used adjusted data generated thereby to the front-end circuit IC 1. The to-be-actually-used adjusted data generated by the signal processing section 61 includes to-be-actually-used adjusted data for the image-interference elimination characteristic. At a step S401 following the step S400, the signal processing section 61 generates an initial value a from the to-be-actually-used adjusted data for the image-interference elimination characteristic, or the signal processing section 61 makes use of a default value as the initial value a of the to-be-actually-used adjusted data for the image-interference elimination characteristic. The initial value a or the default value a is a value of the to-be-actually-used adjusted data to be calibrated in this IMRR calibration processing routine.

Then, at the next step S402, the signal processing section 61 drives the test-signal generation section 7 to generate a test signal for a reception channel assigned to a presently desired TV broadcasting station and drives the switch circuit 6 to select the test signal generated by the test-signal generation section 7. Subsequently, the signal processing section 61 makes the IMRR calibration mode effective.

Then, at the next step S403, the signal processing section 61 initializes a set value x of the to-be-actually-used adjusted data subjected to the IMRR calibration process. In other words, the signal processing section 61 sets the initial value of the set value x of the to-be-actually-used adjusted data subjected to the IMRR calibration process at the minimum value (a−MRANGE) of a range subjected to the IMRR calibration process (that is, x=a−MRANGE as shown in the step S403 of the flowchart of FIG. 19).

Subsequently, at the next step S404, the signal processing section 61 sets a variable minmag at a relatively large value MAXVAL which is to be used as an initial value of the variable minmag. That is to say, minmag=MAXVAL as shown in the step S404 of the flowchart of FIG. 19. The variable minmag is a variable to be compared with a level output by the level detection section 624.

Then, at the next step S405, the signal processing section 61 supplies the set value x to the front-end circuit IC 1 to be set as to-be-actually-used adjusted data for the image-interference elimination characteristic of the complex band pass filter 24 employed in the front-end circuit section 10.

Subsequently, at the next step S406, the signal processing section 61 reads out a detection level amp output by the level detection section 624 employed in the detection circuit 62. Then, at the next step S407, the signal processing section 61 compares the output detection level amp with the variable minmag in order to produce a result of determination as to whether or not the output detection level amp is smaller than the variable minmag (that is, whether or not amp<minmag as shown in the step S407 of the flowchart of FIG. 19).

If the determination result produced in the process carried out at the step S407 indicates that the output detection level amp is smaller than the variable minmag (that is, if amp<minmag), the flow of the IMRR calibration processing goes on to a step S408 at which the signal processing section 61 saves the present set value x as an optimum value x_opt (that is, x_opt=x as shown in the step S408 of the flowchart of FIG. 19) and sets the variable minmag at the output detection level amp generated by the level detection section 624 for the set value x (that is, minmag=amp as shown in the step S408 of the flowchart of FIG. 19). Then, the flow of the IMRR calibration processing goes on to a step S409.

If the determination result produced in the process carried out at the step S407 indicates that the output detection level amp is not smaller than the variable minmag (that is, if amp≧minmag), on the other hand, the flow of the IMRR calibration processing goes on directly to the step S409, skipping the process carried out at the step S408. That is to say, the signal processing section 61 updates neither the optimum value x_opt nor the variable minmag.

At the step S409, the signal processing section 61 compares the set value x with the maximum value (a+PRANGE) of the range subjected to the IMRR calibration process in order to produce a result of determination as to whether or not the set value x is smaller than the maximum value (a+PRANGE) (that is, x<(a+PRANGE) as shown in the step S409 of the flowchart of FIG. 19). If the determination result produced in the process carried out at the step S409 indicates that the set value x is smaller than the maximum value (a+PRANGE), the flow of the IMRR calibration processing goes on to a step S410 at which the set value x is updated to the next value of the to-be-actually-used adjusted data. The next value of the to-be-actually-used adjusted data is a value determined in accordance with the width of the step of the IMRR calibration process. Typically, the set value x is incremented by 1 (that is, x=x+1 as shown in the step S410 of the flowchart of FIG. 19). Then, after the set value x has been updated to the next value of the to-be-actually-used adjusted data, the flow of the IMRR calibration processing goes back to the step S405 at which the signal processing section 61 repeats the processes of the step S405 and the subsequent steps.

If the determination result produced in the process carried out at the step S409 indicates that the set value x is equal to or greater than the maximum value (a+PRANGE), on the other hand, the flow of the IMRR calibration processing goes on to a step S411 at which the signal processing section 61 takes the adjusted-data value x, which has been saved in the process carried out at the step S408 as the optimum value x_opt, as the optimum value of the to-be-actually-used adjusted data.

Then, at the next step S412, the signal processing section 61 terminates the IMRR calibration mode and informs the system controller 4 that the IMRR calibration processing has been ended. Subsequently, at the next step S413, the signal processing section 61 enters a state of carrying out an ordinary operation to process a reception RF signal received through a selected reception channel assigned to a TV broadcasting station desired by the user.

In the IMRR calibration processing described above by referring to the flowchart shown in FIG. 19, an optimum value of to-be-actually-used adjusted data is found by adoption of an all-value search method. It is to be noted, however, that the search technique to be adopted for the IMRR calibration processing is by no means limited to the all-value search method. That is to say, a search technique other than the all-value search method, such as binary search, can also be adopted.

Figure 20:
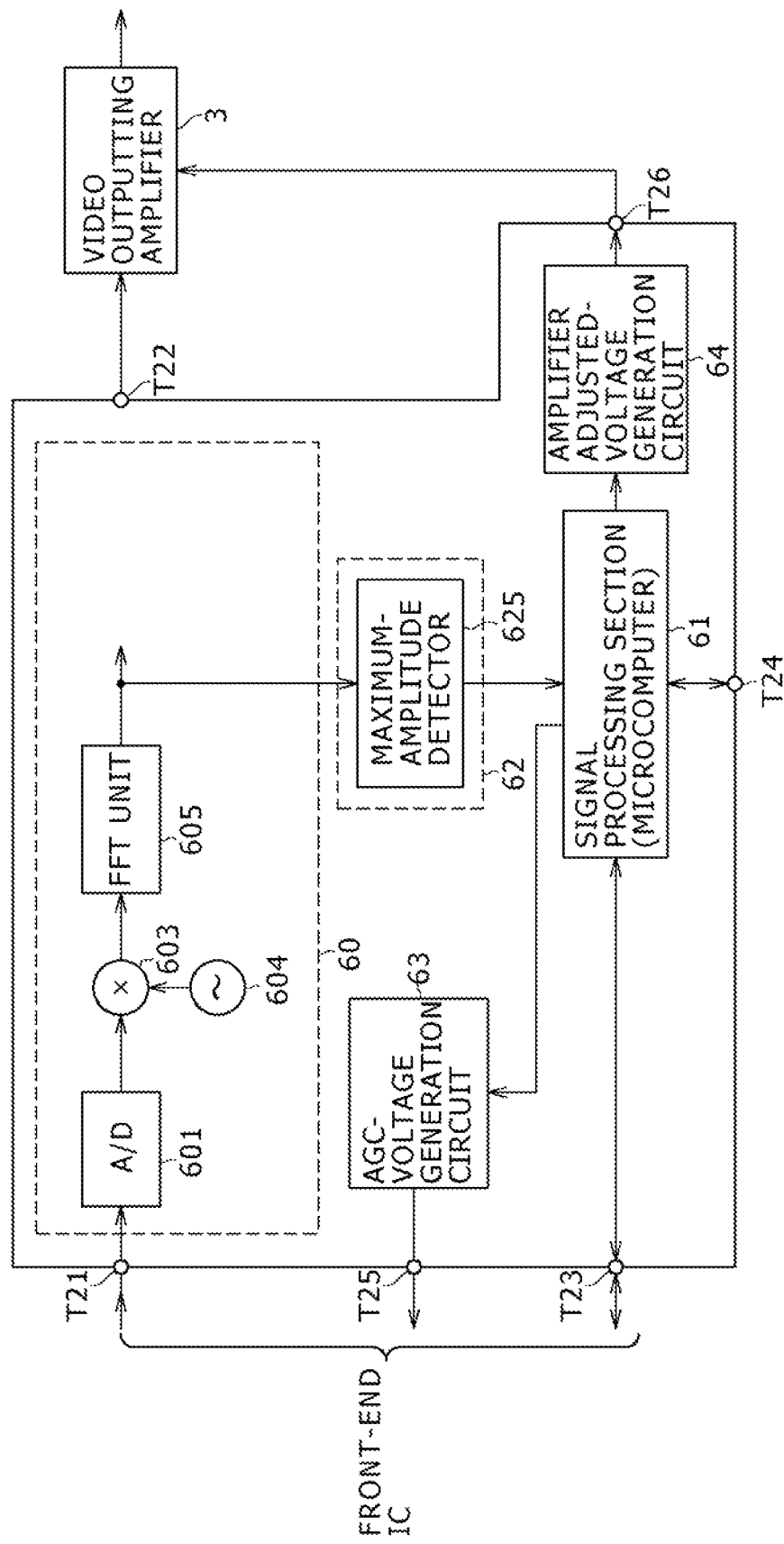
FIG. 20 is another block diagram focusing on the configuration for carrying out the calibration process in an electronic apparatus according to the embodiment.

Second Typical Configuration of the Detection Circuit 62 for Carrying Out the IMRR Calibration FIG. 20 is a block diagram showing the demodulation circuit IC 2, which includes a second typical concrete configuration of the detection circuit 62 for carrying out the IMRR calibration process, by focusing on the configuration of the demodulation circuit section 60.

In the demodulation circuit IC 2 including the second typical concrete configuration of the detection circuit 62, the demodulation circuit section 60 has the same configuration as an OFDM (Orthogonal Frequency Division Multiplexing) demodulation circuit and the demodulation circuit section 60 employs a FFT (Fast Fourier Transform) unit 605 as shown in the block diagram of FIG. 20.

That is, in the demodulation circuit section 60, a signal output by an A/D converter 601 is subjected to an orthogonal demodulation process carried out by a mixer circuit which is composed of a multiplier 603 and a frequency oscillator 604. A signal obtained as a result of the orthogonal demodulation process carried out by the mixer circuit is converted by the FFT unit 605 into a signal in the frequency domain.

In the second typical configuration of the detection circuit 62, a signal output by the FFT unit 605 employed in the demodulation circuit section 60 is supplied to the detection circuit 62. The detection circuit 62 has a maximum-amplitude detector 625. The maximum-amplitude detector 625 is a section for finding a frequency, at which the maximum amplitude of the signal generated by the FFT unit 605 as a result of FFT processing is detected, and outputs the maximum amplitude. The maximum-amplitude detector 625 supplies the amplitude output to the signal processing section 61.

At an IMRR calibration time, the test-signal generation section 7 supplies a test signal having an image interference frequency to the front-end circuit IC 1 by way of the antenna terminal pin T11. Thus, the maximum-amplitude detector 625 supplies an amplitude output at the image interference frequency to the signal processing section 61.

For this reason, the signal processing section 61 caries out an IMRR calibration process in order to set the to-be-actually-used adjusted data for the image elimination characteristic at such a value that the amplitude output supplied by the maximum-amplitude detector 625 to the signal processing section 61 becomes zero. Thus, the signal processing section 61 is capable of setting the to-be-actually-used adjusted data for the image elimination characteristic at a value providing an optimum image elimination characteristic.

As described above, by carrying out a calibration process of calibrating to-be-actually-used adjusted data generated by making use of pre-found adjusted data stored in the nonvolatile memory 51 in advance in this embodiment, it is possible to generate accurate to-be-actually-used adjusted data that takes the aging process of the TV-broadcast receiver into consideration and matches the application environment in which the TV-broadcast receiver is used. In this case, since the signal processing section 61 carries out a calibration process of calibrating to-be-actually-used adjusted data generated by making use of pre-found adjusted data stored in the nonvolatile memory 51 in advance, it is possible to reduce the length of time it takes to perform the calibration process till optimum to-be-actually-used adjusted data is obtained.

It is to be noted the test-signal generation section 7 also used for carrying out a calibration process of calibrating to-be-actually-used adjusted data can also be embedded in the front-end circuit IC 1.

Other Embodiments and Other Modified Versions

Figure 21:
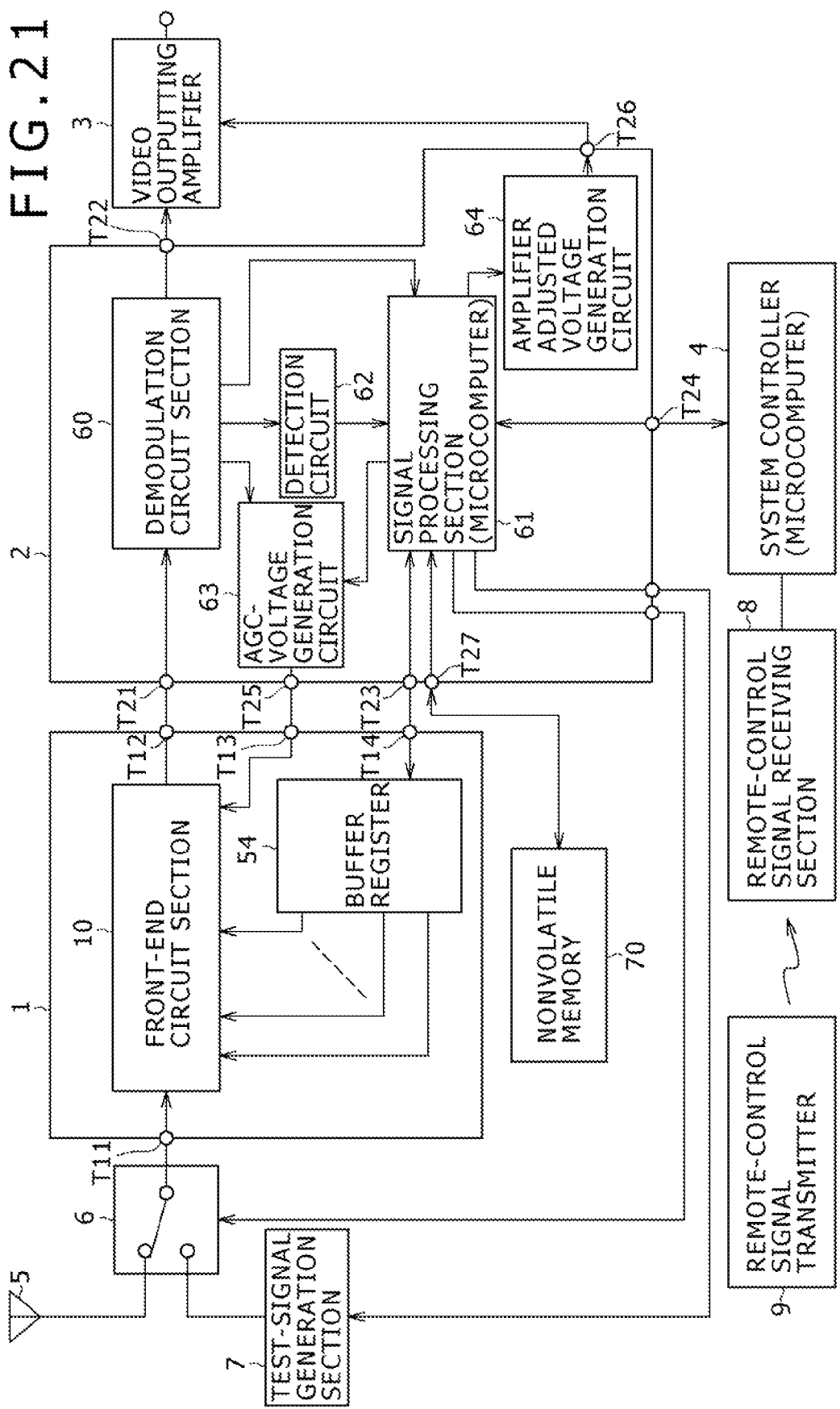
FIG. 21 is a block diagram showing a typical configuration of electronic apparatus accordance to another embodiment.

In accordance with the embodiment described above, the front-end circuit IC 1 includes the nonvolatile memory 51 used for storing adjusted data for a variety of adjustment sections employed in the front-end circuit section 10. However, the nonvolatile memory 51 can also be provided externally to the front-end circuit IC 1. FIG. 21 is a block diagram showing a typical configuration of another embodiment implementing a TV-broadcast receiver that employs a nonvolatile memory 70 provided externally to the front-end circuit IC 1.

As shown in the block diagram of FIG. 21, the front-end circuit IC 1 does not include the nonvolatile memory 51 but employs a buffer register 54 only in place of the I/F section 52. The buffer register 54 is a storage component used for receiving to-be-actually-used adjusted data for a variety of adjustment sections employed in the front-end circuit section 10 from the signal processing section 61 employed in the demodulation circuit IC 2 and used for saving the adjusted data. The to-be-actually-used adjusted data stored in the buffer register 54 is later on supplied to the adjustment sections employed in the front-end circuit section 10.

In addition, in the case of this other embodiment, the external nonvolatile memory 70 provided externally to the front-end circuit IC 1 is connected to the signal processing section 61 of the demodulation circuit IC 2 through a terminal pin T27. When necessary, the signal processing section 61 makes an access to the nonvolatile memory 70 in order to read out pre-found adjusted data from the nonvolatile memory 70. Then, in the same way as the previous embodiment described earlier, the signal processing section 61 generates to-be-actually-used adjusted data on the basis of the pre-found adjusted data read out from the nonvolatile memory 70 and supplies the to-be-actually-used adjusted data to the buffer register 54.

The other embodiment shown in the block diagram of FIG. 21 carries out operations identical with the previous embodiment described earlier and also gives the same effect as well. The only difference between the other embodiment shown in the block diagram of FIG. 21 and the previous embodiment described earlier is that, in the case of the other embodiment shown in the block diagram of FIG. 21, the external nonvolatile memory 70 provided externally to the front-end circuit IC 1 is attached the demodulation circuit IC 2 to serve as a memory used for replacing the nonvolatile memory 51.

In the embodiments described so far, the IMRR calibration process is carried out only on the to-be-actually-used adjusted data for the image-interference elimination characteristic of the band pass filter 24 provided for intermediate frequencies. It is to be noted, however, that subjects of the calibration process are of course by no means limited to the to-be-actually-used adjusted data for the image-interference elimination characteristic of the band pass filter 24 provided for intermediate frequencies. For example, the calibration process can also be carried out on the to-be-actually-used adjusted data for the tuning frequency of every tracking filter and the gain of the filter. In addition, the calibration process can also be carried out on the to-be-actually-used adjusted data representing the cutoff frequency of the complex band pass filter 24 provided for intermediate frequencies. On top of that, the calibration process can also be carried out on the to-be-actually-used adjusted data for variations of a current of the VCO 31 and the to-be-actually-used adjusted data for variations of a voltage generated by the constant-voltage circuit 53 which serves as a constant-voltage generator.

In addition, in the embodiments explained so far, the frequency of the reception channel is taken as a parameter for changes of the adjusted data. It is to be noted, however, that parameters for changes of the adjusted data are of course by no means limited to the frequency of the reception channel. For example, it is also possible to provide a configuration in which adjusted data changing due to an aging process is stored in a nonvolatile memory and the electronic apparatus serving as the TV-broadcast receiver employing the nonvolatile memory is provided with a timer for measuring the lapse of time. Then, from time to time, adjusted data optimum for the present point of time is generated by carrying out an interpolation process based on the adjusted data stored previously in the nonvolatile memory.

Also, it is also possible to provide a configuration in which pre-found adjusted data optimum for a variety of temperatures is stored in a nonvolatile memory and the electronic apparatus serving as the TV-broadcast receiver employing the nonvolatile memory is provided with a temperature measurement section for measuring the ambient temperature. The temperature measurement section is used for measuring the present ambient temperature and adjusted data for the measured present ambient temperature is generated by carrying out an interpolation process based on the pre-found adjusted data stored in advance in the nonvolatile memory for a variety of temperatures.

In addition, in the embodiments explained so far, the RS code is used as an error correction code for pre-found adjusted data stored in the nonvolatile memory. It is to be noted, however, that error correction codes for pre-found adjusted data stored in the nonvolatile memory are by no means limited to the RS code. That is to say, a variety of other error correction codes or a variety of error detection and correction codes can of course be used.

Also, in the embodiments explained so far, a TV-broadcast receiver is taken as an electronic apparatus to which the present application is applied. It is to be noted, however, that electronic apparatus to which the embodiments of the present application are applied are of course by no means limited to the TV-broadcast receiver.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electronic apparatus comprising:
   a first IC including
   an internal configuration section adjustable by making use of pre-found adjusted data,
   a nonvolatile memory used for storing a result of a pre-adjustment process carried out on said internal configuration section to serve as said pre-found adjusted data and for storing correction data for another circuit, and
   an interface section having a data transfer function for transferring data read out from said nonvolatile memory as said pre-found adjusted data and said correction data to an external data recipient and having a data holding function for supplying to-be-actually-used adjusted data received from an external source to said internal configuration section; and a second IC including a signal processing section serving as an internal configuration section connected to said interface section included in said first IC, and a correction-data supplying section configured to supply said correction data to said other circuit, wherein said signal processing section receives said pre-found adjusted data read out from said nonvolatile memory by way of said interface section, generates said to-be-actually-used adjusted data on the basis of said pre-found adjusted data and supplies said to-be-actually-used adjusted data to said interface section, and receives said correction data read out from said nonvolatile memory and supplies said received correction data on the basis of said correction data to said other circuit by way of said correction-data supplying section.

2. The electronic apparatus according to claim 1, said electronic apparatus serving as a broadcast receiving apparatus, wherein:

said first IC functions as a front-end section configured to receive broadcast signals;

said second IC functions as a demodulation section configured to demodulate a signal received from said front-end section; and said other circuit is an amplifier for amplifying a demodulated output supplied from said demodulation section.

3. The electronic apparatus according to claim 1 wherein said pre-found adjusted data is stored in said nonvolatile memory after being subjected to an error-correction encoding process and is subjected to an error-correction decoding process in said signal processing section of said second IC.

4. The electronic apparatus according to claim 1, wherein the interface section transmits the pre-found adjusted data stored in the nonvolatile memory to the signal processing section after a power supply to the electronic apparatus is turned on.

5. A method for adjusting an electronic apparatus including a first IC having an internal configuration section adjustable by making use of pre-found adjusted data, a nonvolatile memory used for storing a result of a pre-adjustment process carried out on said internal configuration section to serve as said pre-found adjusted data and for storing correction data for another circuit, and an interface section having a data transfer function for transferring data read out from said nonvolatile memory as said pre-found adjusted data and said correction data to an external data recipient and having a data holding function for supplying to-be-actually-used adjusted data received from an external source to said internal configuration section, and a second IC having a signal processing section serving as an internal configuration section connected to said interface section included in said first IC, and a correction-data supplying section configured to supply said correction data to said other circuit, said method comprising:

storing said pre-found adjusted data and said correction data in said nonvolatile memory;

receiving said pre-found adjusted data read out from said nonvolatile memory by way of said interface section;

generating said to-be-actually-used adjusted data on the basis of said pre-found adjusted data;

supplying said to-be-actually-used adjusted data to said interface section, by said signal processing section;

receiving said correction data read out from said nonvolatile memory by way of said interface section; and supplying said correction data on the basis of said received correction data to said other circuit by way of said correction-data supplying section.

6. An integrated circuit comprising:

an internal configuration section adjustable by making use of pre-found adjusted data, a nonvolatile memory used for storing a result of a pre-adjustment process carried out on said internal configuration section to serve as said pre-found adjusted data and for storing correction data for another circuit, and an interface section having a data transfer function for transferring data read out from said nonvolatile memory as said pre-found adjusted data and said correction data to an external data recipient and having a data holding function for supplying to-be-actually-used adjusted data received from an external source to said internal configuration section, wherein transferring the data out from said nonvolatile memory causes a second integrated circuit to:

receive said pre-found adjusted data read out from said nonvolatile memory by way of said interface section, generate said to-be-actually-used adjusted data on the basis of said pre-found adjusted data and supply said to-be-actually-used adjusted data to said interface section, and receive said correction data read out from said nonvolatile memory and supply said received correction data on the basis of said correction data to said other circuit.

7. The integrated circuit according to claim 6, wherein said internal configuration section is a front-end section configured to receive broadcast signals.

8. The integrated circuit according to claim 6, wherein the internal configuration section includes at least one adjustable section adjusted using the to-be-actually-used adjusted data received from the external source.

9. An electronic apparatus comprising:

a first IC including an internal configuration section adjustable by making use of pre-found adjusted data, and a data holding section configured to supply to-be-actually used adjusted data received from an external source to said internal configuration section as said pre-found adjusted data;

a nonvolatile memory used for storing a result of a pre-adjustment process carried out on said internal configuration section of said first IC to serve as said pre-found adjusted data and for storing correction data for another circuit; and a second IC serving as an internal configuration section, and including a signal processing section connected with said data holding section of said first IC and said nonvolatile memory, and a correction-data supplying section configured to supply correction data to said other circuit, wherein said signal processing section:

receives said pre-found adjusted data read out from said nonvolatile memory, generates said to-be-actually-used adjusted data on the basis of said pre-found adjusted data and supplies said to-be-actually-used adjusted data to said data holding section; and receives said correction data read out from said nonvolatile memory, and supplies said correction data on the basis of said received correction data to said other circuit by way of said correction-data supplying section.

* * * * *